United States Patent
Honami et al.

(10) Patent No.: US 8,533,157 B2
(45) Date of Patent: Sep. 10, 2013

(54) SNAPSHOT MANAGEMENT APPARATUS AND METHOD, AND STORAGE SYSTEM

(75) Inventors: Koji Honami, Tokyo (JP); Motoaki Satoyama, Sagamihara (JP); Naohiro Fujii, Yokohama (JP); Naoto Ueda, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1174 days.

(21) Appl. No.: 12/379,635

(22) Filed: Feb. 26, 2009

(65) Prior Publication Data
US 2009/0172039 A1 Jul. 2, 2009

Related U.S. Application Data

(63) Continuation of application No. 11/285,203, filed on Nov. 23, 2005, now Pat. No. 7,519,625.

(30) Foreign Application Priority Data

Sep. 27, 2005 (JP) .................................. 2005-279208

(51) Int. Cl.
*G06F 7/00* (2006.01)
*G06F 17/00* (2006.01)
(52) U.S. Cl.
USPC ......................................... 707/639; 707/649
(58) Field of Classification Search
USPC ................. 707/649, 674–675, 609, 639, 640, 707/644; 711/161, 162
See application file for complete search history.

(56) References Cited

U.S. PATENT DOCUMENTS

| | | | |
|---|---|---|---|
| 6,205,450 B1 | 3/2001 | Kanome | |
| 6,594,744 B1 | 7/2003 | Humlicek et al. | |
| 6,694,413 B1 | 2/2004 | Mimatsu et al. | |
| 6,799,189 B2 | 9/2004 | Huxoll | |
| 7,478,251 B1* | 1/2009 | Diab et al. | 714/14 |
| 7,908,251 B2* | 3/2011 | Jones et al. | 707/674 |
| 2002/0049814 A1 | 4/2002 | Yoo | |
| 2003/0131207 A1 | 7/2003 | Arakawa et al. | |
| 2003/0182330 A1 | 9/2003 | Manley et al. | |
| 2004/0010487 A1 | 1/2004 | Prahlad et al. | |
| 2004/0078636 A1 | 4/2004 | Suzaki | |
| 2004/0103104 A1 | 5/2004 | Hara et al. | |
| 2004/0117572 A1 | 6/2004 | Welsh et al. | |
| 2004/0123285 A1 | 6/2004 | Berg et al. | |
| 2004/0186900 A1* | 9/2004 | Nakano et al. | 709/213 |

(Continued)

FOREIGN PATENT DOCUMENTS

| | | |
|---|---|---|
| JP | 2004-5370 | 1/2004 |
| JP | 2004-342050 | 12/2004 |

*Primary Examiner* — Vincent F Boccio
(74) *Attorney, Agent, or Firm* — Antonelli, Terry, Stout & Kraus, LLP.

(57) ABSTRACT

A high-performance and highly-reliable snapshot management apparatus and method, and a storage system are provided that can prevent the adverse influence of overhead when they retain a multiplicity of snapshots. An operational volume is set in a storage area provided by a first storage apparatus and a plurality difference volumes are set in a storage area provided by a second storage apparatus. In response to data writing to the operational volume, difference data is saved in the difference volumes and management tables for it are created, with each snapshot being managed according to the management tables. Each management table is divided according to one or more snapshots in accordance with the snapshot creation time. The second and any following management tables store specified inheritance information to inherit the content of the preceding management tables.

6 Claims, 23 Drawing Sheets

(56) References Cited

U.S. PATENT DOCUMENTS

| | | |
|---|---|---|
| 2005/0027758 A1 | 2/2005 | Meller et al. |
| 2005/0033878 A1 | 2/2005 | Pangal et al. |
| 2005/0033929 A1 | 2/2005 | Burton et al. |

* cited by examiner

FIG.6

| BLOCK ADDRESS | CoW REQUEST |
|---|---|
| 0 | 0 |
| 1 | 0 |
| 2 | 0 |
| : | : |
| k-1 | 1 |

| BLOCK ADDRESS | USAGE STATUS |
|---|---|
| 0 | 0 |
| 1 | 1 |
| 2 | 0 |
| : | : |
| p-1 | 1 |

| SNAPSHOT NUMBER | DIFFERENCE VOLUME NUMBER |
|---|---|
| 1 | 1 |
| 2 | 1 |
| 3 | 2 |
| : | : |
| n | p |

| BLOCK ADDRESS | CoW BITMAP | SNAPSHOT 1 | SNAPSHOT 2 | ... | SNAPSHOT M |
|---|---|---|---|---|---|
| 0 | 00...0 | 0 | 0 | ... | 0 |
| 1 | 00...0 | 1 | 2 | ... | 3 |
| 2 | 10...0 | NONE | 4 | ... | NONE |
| .. | .. | .. | .. | ... | .. |
| k-1 | 11...1 | NONE | NONE | ... | NONE |

FIG.10

| BLOCK ADDRESS | CoW BITMAP | INHERITANCE | SNAPSHOT M+ | ... | SNAPSHOT N |
|---|---|---|---|---|---|
| 0 | 00...0 | NONE | 101 | ... | 101 |
| 1 | 00...0 | NONE | 102 | ... | 103 |
| 2 | 10...0 | 100 | 100 | ... | 100 |
| .. | .. | .. | .. | ... | .. |
| k1 | 11...1 | NONE | NONE | ... | NONE |

61A 61C 61B 61B 61

SNAPSHOT MANAGEMENT APPARATUS AND METHOD, AND STORAGE SYSTEM

CROSS-REFERENCE TO RELATED APPLICATIONS

This application is a continuation of U.S. application Ser. No. 11/285,203, filed Nov. 23, 2005, now U.S. Pat. No. 7,519,625 and which application relates to and claims priority from Japanese Patent Application No. 2005-279208, filed on Sep. 27, 2005, the entire disclosure of which is incorporated herein by reference.

BACKGROUND OF THE INVENTION

The present invention relates to a snapshot management apparatus and method, and a storage system. This invention is preferably applied to, for example, a storage system designed to provide a large-scale snapshot environment by connecting a plurality of external storage apparatuses.

Conventionally, as one function of a NAS (Network Attached Storage) server or a disk array apparatus, there is a so-called "snapshot function" of retaining an image of a designated operational volume (that is a logical volume to or from which data is written or read into a host system) upon receiving a snapshot creation instruction. The snapshot function is used to restore the operational volume to the state it was in at a designated time when, for example, data is lost by human error or when the state of the file system at a particular time needs to be restored.

A snapshot that is the image of the operational volume retained by the snapshot function (sometimes referred to as "virtual volume") is not the data of the entire operational volume at the time of receipt of the snapshot creation instruction, but is composed of the data of the current operational volume and difference data that is the difference between the operational volume at the time of receipt of the snapshot creation instruction and the current operational volume. Based on the difference data and the current operational volume data, the content of the operational volume is restored to the state it was in at the time of receipt of the snapshot creation instruction. Accordingly, the snapshot function has the advantageous effect of being able to maintain the image of the operational volume by using a smaller storage capacity than would be the case if the content of the entire operational volume were stored.

Lately, a method for maintaining snapshots of plural generations has been suggested (see JP-A-2004-342050). For example, JP-A-2004-342050 suggests managing snapshots of plural generations by using a mapping table that associates each block of an operational volume with each block of a difference volume that stores difference data of a snapshot of each generation.

Also in recent years, JP-A-2004-005370 discloses a method for effectively utilizing an old storage apparatus without remodelling it when a new storage apparatus is introduced. By combining the method disclosed in JP-A-2004-342050 and the method disclosed in JP-A-2004-005370, it has become possible to easily construct a larger-scale snapshot environment by using a plurality of external storage apparatuses.

However, by the snapshot management method disclosed in JP-A-2004-342050, a single mapping table is used to centrally manage all the snapshots. Accordingly, as the number of created snapshots increases, the scale of the mapping table becomes larger and the frequency of access to the mapping table by data write processing increases. There is also a problem of poor accessibility to the mapping table due to the expansion of the scale of the mapping table.

Where a mapping table is retained in a storage apparatus so that snapshots can be restored even after reactivation of a server, its disadvantage is that all the snapshots may be lost if a failure occurs in the storage apparatus. This problem tends to easily occur when an external storage apparatus connected via a network is used. The operation of the snapshot function can no longer be continued just because the storage apparatus retaining the mapping table becomes inaccessible due to line disturbance.

As a means of solving the above-described problem, there is a method for retaining, in a plurality of storage apparatuses, copies of a mapping table necessary to maintain snapshots. This method has the advantage of being able to continue the operation of the snapshot function even if a failure occurs at part of the storage apparatuses.

However, there is a problem in that the size of a mapping table is large in order to contain entries to cover all blocks of the operational volume, and therefore, a large storage capacity is required to retain a plurality of mapping tables. There is also the problem of synchronization of the processing for updating the mapping tables retained by the respective storage apparatuses.

By any of the methods described above, the mapping tables relevant to all the snapshots need to be accessed when data is written to the operational volume and the difference data is saved in the difference volume. Therefore, when many snapshots are retained, writing speed decreases due to overhead, thereby leaving the problem of the performance of the entire system deteriorating.

SUMMARY OF THE INVENTION

The present invention has been made in consideration of the above conventional art problems. This invention aims to provide a high-performance and highly-reliable snapshot management apparatus and method, and storage system.

In order to solve the above-described problem, according to one aspect of the present invention, there is provided a snapshot management apparatus for creating and managing a snapshot or snapshots of one or more generations, each snapshot being composed of an image of an operational volume at a specified time, wherein data from a host system is written to the operational volume and the data in the operational volume is read into the host system. The snapshot management apparatus includes: a volume setting unit for setting the operational volume in a storage area provided by a first storage apparatus and setting a difference volume in a storage area provided by a second storage apparatus; a difference data saving unit for saving, in the difference volume, difference data that is the difference between the operational volume at the time of creation of the relevant snapshot and the operational volume in its current state, in response to data writing to the operational volume; and a snapshot managing unit for creating a management table that stores management information for the snapshots, and managing each snapshot according to the management table. The snapshot managing unit creates the management table which is divided according to one or more snapshots; and if there is more than one management table, the second and any following management tables store specified inheritance information to inherit the content of the preceding management tables.

According to another aspect of this invention, there is provided a snapshot management method for creating and managing a snapshot or snapshots of one or more generations, each snapshot being composed of an image of an operational volume at a specified time, wherein data from a host system is written to the operational volume and the data in the operational volume is read into the host system. The snapshot management method includes: a first step of setting the operational volume in a storage area provided by a first storage apparatus and setting a difference volume in a storage area provided by a second storage apparatus; and a second step of saving, in the difference volume, difference data that is the difference between the operational volume at the time of creation of the relevant snapshot and the operational volume in its current state, in response to data writing to the operational volume, and of creating a management table that stores management information for the snapshots and manages each snapshot according to the management table. In the second step, the management table which is divided according to one or more snapshots is created; and if there is more than one management table, the second and any following management tables store specified inheritance information to inherit the content of the preceding management tables.

According to a further aspect of this invention, there is provided a storage system including a snapshot management apparatus, one or more first storage apparatuses, and one or more second apparatuses, wherein the snapshot management apparatus creates and manages a snapshot or snapshots of one or more generations, each snapshot being composed of an image of an operational volume at a specified time, wherein data from a host system is written to the operational volume and the data in the operational volume is read into the host system, and the snapshot management apparatus is connected to the first and second storage apparatuses respectively so that they are capable of freely communicating with each other. The snapshot management apparatus includes: a volume setting unit for setting the operational volume in a storage area provided by a first storage apparatus and setting a difference volume in a storage area provided by a second storage apparatus; a difference data saving unit for saving, in the difference volume, difference data that is the difference between the operational volume at the time of creation of the relevant snapshot and the operational volume in its current state, in response to data writing to the operational volume; and a snapshot managing unit for creating a management table that stores management information of the snapshots, and managing each snapshot according to the management table; and wherein the snapshot managing unit creates the management table which is divided according to one or more snapshots; and if there is more than one management table, the second and any following management tables store specified inheritance information to inherit the content of the preceding management tables.

In the snapshot management apparatus and method, and storage system of this invention, it is possible to save the difference data relating to the current snapshot and record its management information by accessing the latest management table. As a result, the scale of the management table can be kept to a desirable size regardless of the number of retained snapshots. Therefore, overhead caused by access to the management table can be reduced and it is thereby possible to effectively prevent a decrease in writing speed due to the overhead, as well as the resultant deterioration of the performance of the entire system.

Moreover, in the snapshot management apparatus and method, and storage system of this invention, each of the second and following management tables stores inheritance information to take over the content of the previous management table. Therefore, it is possible to manage the snapshots on a management table basis. Even if inconsistency in the current snapshot arises from, for example, line disturbance, the other snapshots managed by the other management tables can be protected from the influence of that inconsistency.

Accordingly, this invention can realize a high-performance and highly-reliable snapshot management apparatus and method, and storage system.

BRIEF DESCRIPTION OF THE DRAWINGS

FIG. 6 is a chart that explains a CoW request management table.

FIG. 7 is a chart that explains an empty block management table.

FIG. 8 is a chart that explains a snapshot arrangement table.

FIG. 9 is a chart that explains a mapping table.

FIG. 10 is a chart that explains another mapping table.

DETAILED DESCRIPTION OF THE INVENTION

An embodiment of this invention will be described in detail with reference to the attached drawings.

(1) Outline of Snapshot Management Method According to this Embodiment

Figure 1:
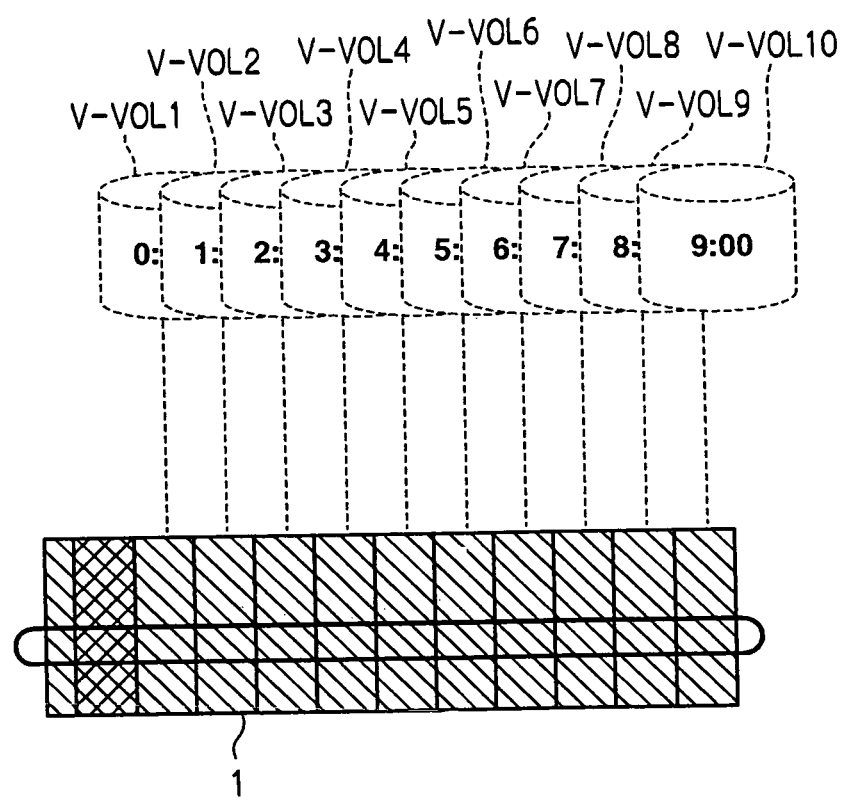
FIG. 1 is a conceptual diagram that explains a conventional snapshot management method.
Figure 2:
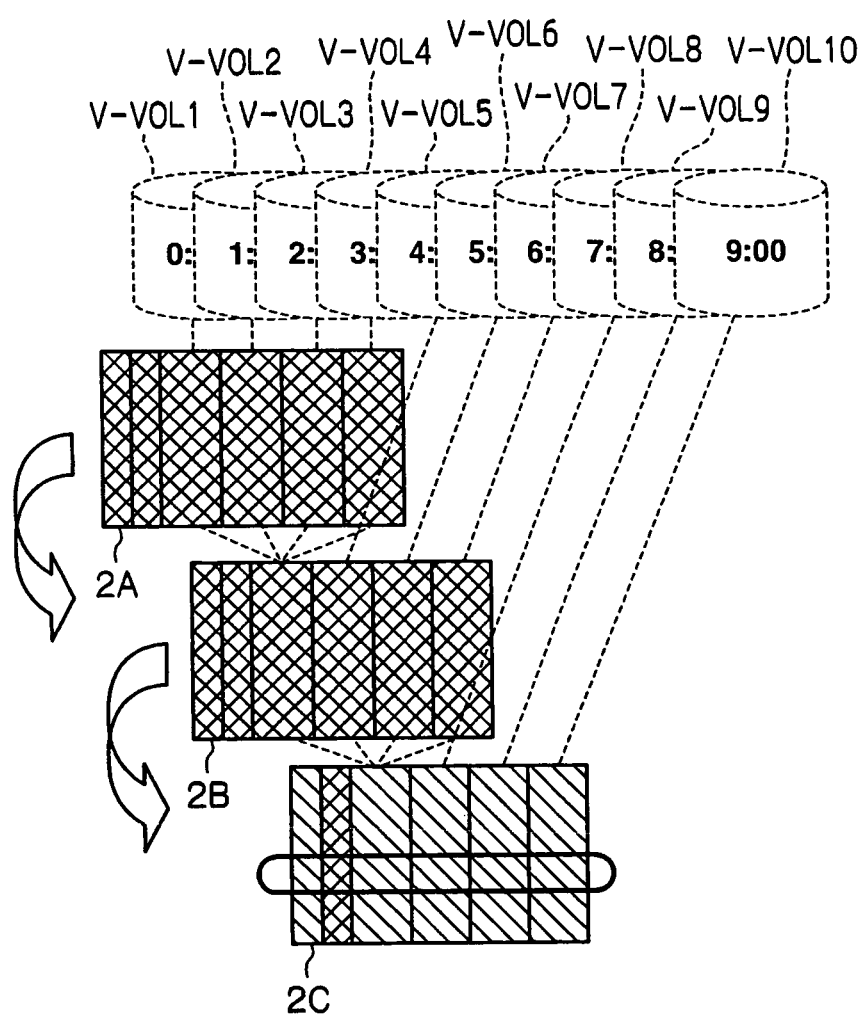
FIG. 2 is a conceptual diagram that describes the outline of a snapshot management method according to an embodiment of this invention.

Unlike the conventional method of managing a plurality of snapshots V-VOL1 to V-VOL10 by using a single mapping table 1 as shown in FIG. 1, the snapshot management method according to an embodiment of this invention is characterized in that each mapping table 2A, 2B, or 2C is divided into blocks in accordance with creation times of, for example, snapshots V-VOL1 to V-VOL10 and information in preceding mapping table(s) 2A or/and 2B is aggregated and retained in a new mapping table 2B or 2C.

Using the snapshot management method of this embodiment, it is possible to save difference data and record its management information by accessing the latest mapping table 2C from among the mapping tables 2A to 2C with divided blocks, thereby preventing deterioration in writing performance. Moreover, using the snapshot management method of this embodiment, the number of retainable snapshots can be increased by adding the mapping tables 2A to 2C as necessary. Therefore, it is possible to easily realize an active expansion of operation scale.

Another feature of the snapshot management method according to this embodiment is provision of a plurality of difference volumes D-VOL1 to D-VOL3, distribution of difference data obtained at the time of creation of snapshots V-VOL1 to V-VOL9 to difference volumes D-VOL1 to D-VOL3, and storage of the distributed difference data in the difference volumes D-VOL1 to D-VOL3. Accordingly, using the snapshot management method according to this embodiment, the difference data is distributed in snapshot units to the difference volumes D-VOL1 to D-VOL3, and the respective mapping tables 2A to 2C are created for their corresponding difference volumes D-VOL1 to D-VOL3, thereby enabling the management of the snapshots VOL-V1 to VOL-V9 in difference volume D-VOL1 to D-VOL3 units.

As a result, by the snapshot managing method according to this embodiment, correspondences between the difference volumes D-VOL1 to D-VOL3 and the snapshots V-VOL1 to V-VOL9 are clarified. Therefore, even if any of difference volumes D-VOL1 to D-VOL3, becomes inaccessible due to a failure, the operation of the snapshot function can be continued by using the remaining difference volumes D-VOL1, D-VOL2, and/or D-VOL3. It is also possible to stop the operation of the difference volume(s) D-VOL1, D-VOL2, and/or D-VOL3 storing old snapshots, any of V-VOL1 to V-VOL9, which are not referenced, for the purposes of cost reduction and conservation, and to resume the operation of those difference volume(s) whenever necessary.

A storage system to which the snapshot managing method according to this embodiment is applied will be described below. In the following explanation, "P-VOL" represents an operational volume, "D-VOL" represents a difference volume, and "V-VOL" represents a snapshot.

(2) Configuration of Storage System According to this Embodiment

Figure 4:
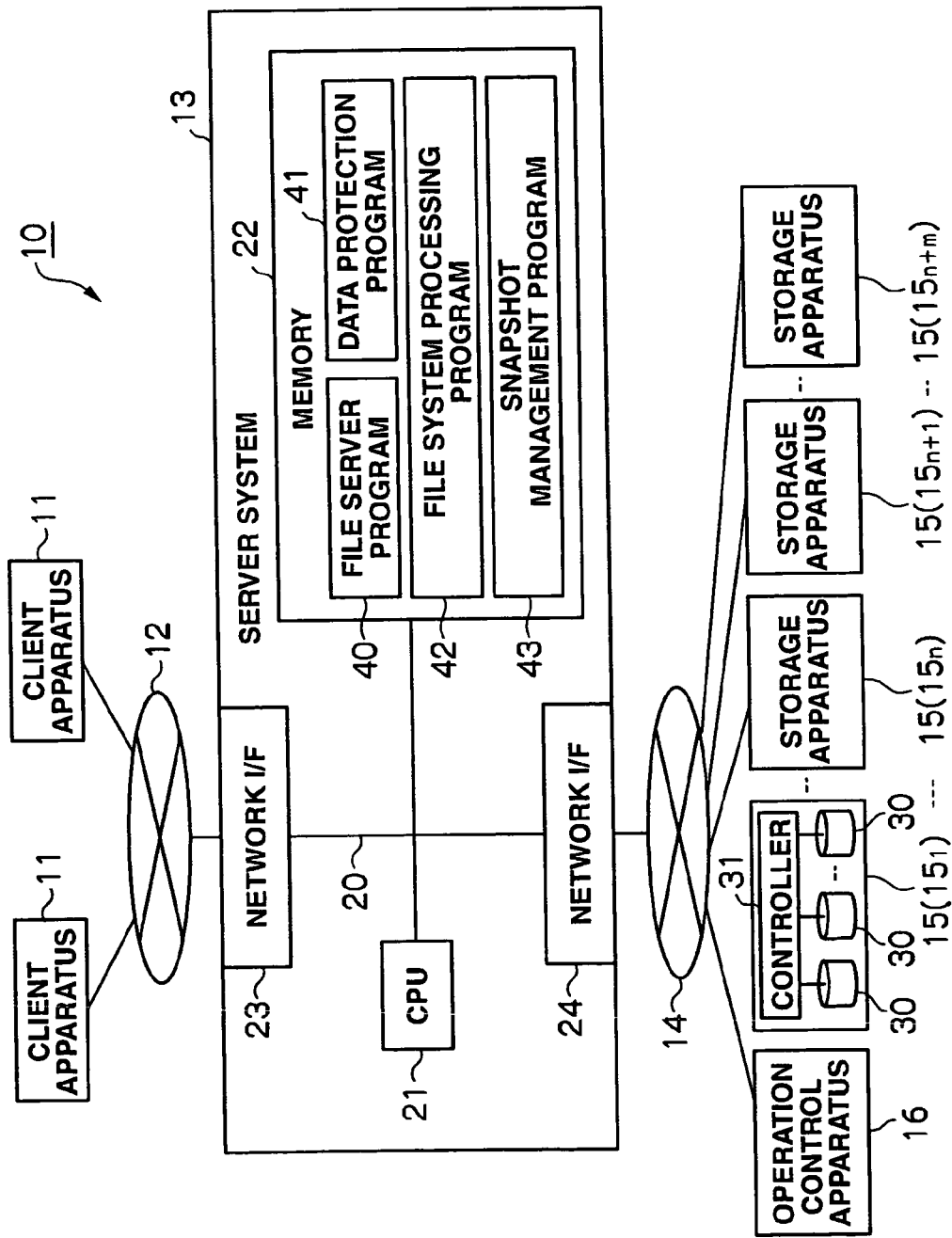
FIG. 4 is a block diagram illustrating the configuration of a storage system according to the embodiment.

FIG. 4 shows a storage system 10 to which the snapshot managing method according to this embodiment is applied. In this storage system 10, a plurality of client apparatuses 11 is connected to a NAS server system 13 via a front-end network 12, and the NAS server system 13 is connected to a plurality of storage apparatuses 15 ($15_1$ to $15_{n+m}$) and an operation control apparatus 16 via a back-end network 14.

The client apparatus 11, as a host system, is a computer device equipped with information processing resources such as a CPU (Central Processing Unit) and memory, and is composed of, for example, a personal computer, a workstation, or a mainframe. The client apparatus 11 includes: information input devices (not shown in the drawing) such as a keyboard, a switch, a pointing device, and/or a microphone; and information output devices (not shown in the drawing) such as a monitor display and/or speakers.

The front-end network 12 is composed of, for example, a SAN (Storage Area Network), a LAN (Local Area Network), the Internet, public line(s), or private line(s). Communication between the client apparatuses 11 and the NAS server system 13 via the front-end network 12 is conducted according to Fiber Channel Protocol (FCP) when the front-end network 12 is a SAN, or according to Transmission Control Protocol/Internet Protocol (TCP/IP) when the front-end network 12 is a LAN.

The NAS server system 13 includes: a CPU 21, memory 22, a first network interface 23, and a second network interface 24 that are mutually connected via buses 20. The NAS server system 13 executes processing in order to provide a file sharing service and a snapshot service to the client apparatuses 11. Various control programs for that purpose are stored in the memory 22. The CPU 21 of the NAS server system 13 executes various processing according to the control programs stored in the memory 22.

The first network interface 23 is the interface that performs protocol control during communication with the client apparatuses 11. The first network interface 23 is equipped with a plurality of ports and is connected via any one of the ports to the front-end network 12. The respective ports are given their own network addresses such as a World Wide Name (WWN) or an Internet Protocol (IP) address to identify themselves on the front-end network 12.

The second network interface 24 is the interface that performs protocol control during communication with the storage apparatuses 15 and operation control apparatus 16 connected to the NAS server system 13. Like the first network interface 23, the second network interface 24 is equipped with a plurality of ports and is connected via any one of the ports to the back-end network 14. The respective ports of the second network interface 24 are also given network addresses such as a WWN or IP address to identify themselves on the back-end network 14.

Like the front-end network 12, the back-end network 14 is composed of, for example, a SAN, a LAN, the Internet, or public or private lines. Communication between the NAS server system 13 and the respective storage apparatuses 15, and between the NAS server system 13 and the operation control apparatus 16 is conducted via the back-end network 14 according to, for example, Fiber Channel Protocol (FCP) when the back-end network 14 is a SAN, or according to TCP/IP when the back-end network 14 is a LAN.

Each storage apparatus 15 is composed of: a plurality of disk units 30, each of which stores data; and a controller 31 for controlling data input to and output from these disk units 30.

Each disk unit 30 contains, for example, expensive disk devices such as SCSI (Small Computer System Interface) disks, or inexpensive disk devices such as SATA (Serial AT Attachment) disks or optical disks. The respective disk units 30 are operated by the controller 31 according to a RAID system. One or more logical volumes are set on physical storage areas provided by one or more disk units 30. These logical volumes store data in blocks of predetermined size.

Each logical volume is given its own unique identifier (LUN: Logical Unit Number). In this embodiment, data input and output is conducted by designating, as an address, a combination of the above-mentioned identifier and a unique block number (LBA: Logical Block Address) assigned to each block.

Figure 3:
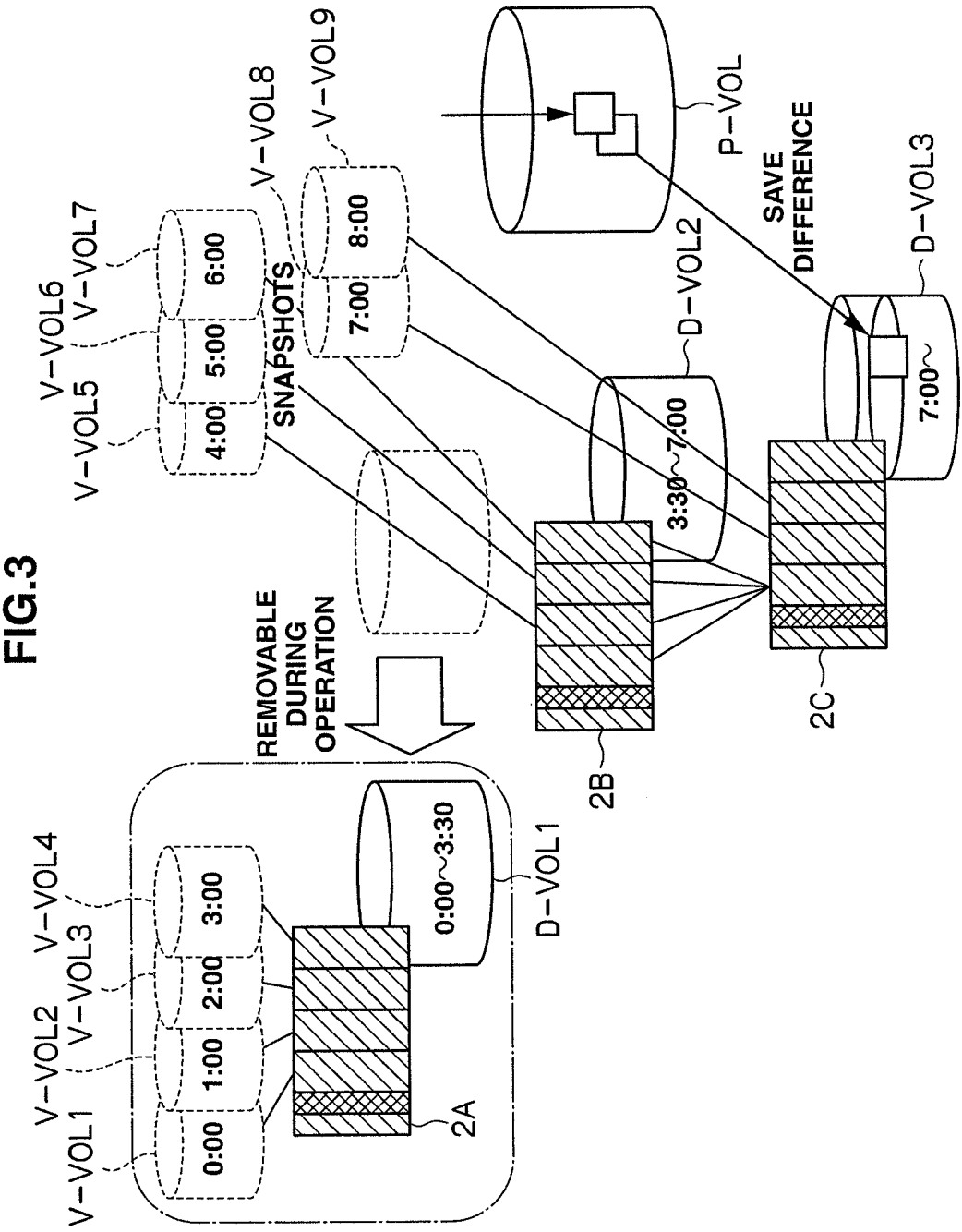
FIG. 3 is a conceptual diagram that describes the outline of the snapshot management method according to that embodiment.

In the storage system 10 according to this embodiment, some of the storage apparatuses 15 connected to the NAS server system 13 are used for the file sharing service. The storage areas provided by the respective storage apparatuses $15_1$ to $15_n$ for the file sharing service are virtualized by the NAS server system 13. The NAS server system 13 CPU 21 defines one or more operational volumes P-VOL (see FIG. 3) on the virtualized storage areas described above. The operational volume(s) store data from the client apparatuses 11. The remaining storage apparatuses $15_{n+1}$ to $15_{n+m}$ are used for the snapshot service. The CPU 21 of the NAS server system 13 defines one difference volume D-VOL (see FIG. 3) for each of the storage apparatuses $15_{n+1}$ to $15_{n+m}$ in the storage areas provided by the respective storage apparatuses $15_{n+1}$ to $15_{n+m}$. Difference data obtained at the time of creation of the relevant snapshots V-VOL (see FIG. 3) is sequentially saved (or stored) in the corresponding difference volumes D-VOL (see FIG. 3).

The controller 31 includes a network interface for communication with the NAS server system 13 via the back-end network 14, a disk interface for communication with each disk unit 30, and cache memory that temporarily retains data to be read from or written to the operational volumes P-VOL and the difference volumes D-VOL. The controller 31 controls data input and output between the NAS server system 13 and the disk units 30.

The operation control apparatus 16 is a computer device equipped with information processing resources such as a CPU and memory, and is, for example, a personal computer, a workstation, or a mainframe. The operation control apparatus 16 executes control processing that operates or stops the operation of a designated storage apparatus 15 upon receiving an instruction from the NAS server system 13 via the back-end network 14.

Now various control programs stored in the memory 22 of the NAS server system 13 will be described. As is clear from FIG. 4, the memory 22 of the NAS server system 13 stores control programs such as a file server program 40, a data protection program 41, a file system processing program 42, and a snapshot management program 43.

In response to a file access request from the client apparatus 11, the file server program 40 issues a file or directory read processing request or write processing request to the file system processing program 42 and sends the result to the client apparatus 11.

In response to a file or directory read processing request or write processing request from the file server program 40, the file system processing program 42 issues, to the snapshot management program 43, a data read request or data write request that designates the LUN of a logical volume (the operational volume P-VOL) storing the relevant file or directory, the LBA of the corresponding block, and the data size. The data protection program 41 requests the creation or deletion of the snapshots V-VOL, assignment of the difference volumes D-VOL, and change of connection state to the snapshot management program 43.

The snapshot management program 43 is the program that: manages the difference volumes D-VOL storing difference data necessary to maintain the operational volume P-VOL, which stores a file system etc., and the snapshots V-VOL; and executes various processing such as processing in response to requests from the file system processing program 42 and the data protection program 41, processing for maintaining the snapshots V-VOL, and processing for making the snapshots V-VOL available. The snapshot management program 43 is composed of: subprograms for starting the relevant processing in response to the respective requests; and the management tables used by these subprograms.

Figure 5:
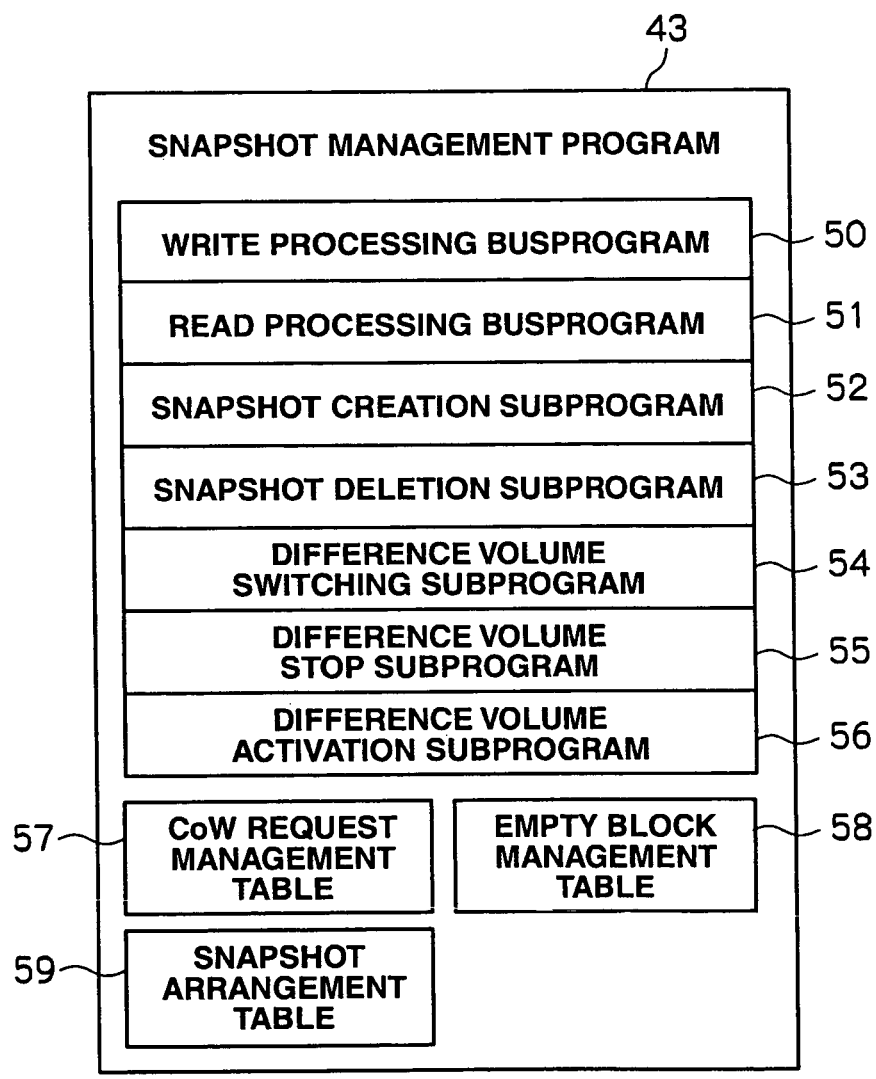
FIG. 5 is a conceptual diagram that explains a snapshot management program.

FIG. 5 shows the specific configuration of the snapshot management program 43. As shown in FIG. 5, the snapshot management program 43 includes: a write processing subprogram 50; a read processing subprogram 51, a snapshot creation subprogram 52; a snapshot deletion subprogram 53; a difference volume switching subprogram 54; a difference volume stop subprogram 55; a difference volume activation subprogram 56; a CoW (Copy on Write) request management table 57; an empty block management table 58; and a snapshot arrangement table 59.

Of the above-listed subprograms, the write processing subprogram 50 is the program that executes processing for writing data to the operational volume P-VOL in response to a write request from the file system management program 42. The read processing subprogram 51 executes processing for reading data from the operational volume P-VOL in response to a read request from the file system processing program 42. In response to a request from the data protection program 41, the snapshot creation subprograms 52 execute processing for creating a new snapshot V-VOL, while the snapshot deletion subprogram 53 executes processing for deleting an already created snapshot V-VOL.

The difference volume switching subprogram 54 switches the difference volume D-VOL to save difference data obtained upon creation of a snapshot V-VOL as described later in detail. The difference volume stop subprogram 55 stops the operation of the storage apparatuses $15_{n+1}$ to $15_{n+m}$ respectively retaining their corresponding difference volumes D-VOL, while the difference volume activation subprogram 56 activates the operation of such storage apparatuses $15_{n+1}$ to $15_{n+m}$.

The CoW request management table 57 is used to judge whether or not a CoW request (a request to save data, which is stored in the relevant block of the operational volume P-VOL, on the difference volume D-VOL) is made for each block of the operational volume P-VOL, at the time of data writing to the operational P-VOL.

As shown in FIG. 6, this CoW request management table 57 has CoW request fields 57A associated with the respective blocks of the operational volume P-VOL. Each CoW request field 57A stores "1" if a CoW request is made for the relevant block of the operational volume P-VOL. If no CoW request is made, the CoW request field 57A stores "0." Accordingly, in the initial state, each CoW request field 57A stores "0." The value stored in each CoW request field 57A is equal to the result of a logical OR operation regarding the bits in a CoW bitmap of a mapping table 60 or 61 described later, corresponding to each block of the operational volume P-VOL.

The empty block management table 58 shows the usage state of the current difference volume D-VOL and is created for each difference volume D-VOL. As shown in FIG. 7, this empty block management table 58 has usage status fields 58A associated with the respective blocks of the corresponding difference volume D-VOL. Each usage status field 58A stores "1" if the relevant block of the corresponding difference volume D-VOL is empty, that is, if difference data is not yet saved in that block. If any difference data is already saved in that block, the usage status field 58A stores "0." Accordingly, in the initial state, each usage status field 58A stores "1."

The snapshot arrangement table 59 shows in which difference volume D-VOL the difference data of the snapshot V-VOL for each generation is stored. As shown in FIG. 8, this snapshot arrangement table 59 has difference volume number storage fields 59A associated with the snapshots V-VOL for the respective generations. Each difference volume number storage field 59A stores a difference volume number that is an ID number for the relevant difference volume D-VOL associated with the corresponding snapshot V-VOL. This difference volume number is a serial number given to each difference volume D-VOL. In the example of FIG. 8, first and second generation snapshot difference data is stored in the difference volume D-VOL with the number "1," and the third generation snapshot difference data is stored in the difference volume D-VOL with the number "2."

FIG. 9 shows a mapping table 60 for maintaining and managing the multiple-generation snapshots V-VOL, and the mapping table 60 stores management information for the snapshots V-VOL associated with the mapping table 60. The mapping table 60 is created for each difference volume D-VOL (each storage apparatus $15_{n+1}$ to $15_{n+m}$) and is stored in the relevant difference volume D-VOL.

The mapping table 60 has CoW bitmap fields 60A and plural sets of block address fields 60B corresponding to each block of the operational volume P-VOL.

Each CoW bitmap field 60A stores a CoW bitmap that shows whether or not a CoW request is made for the relevant block of the corresponding operational volume P-VOL. The CoW bitmap consists of a plurality of bits which correspond to old-generation snapshots V-VOL, and are indicated in chronological order starting from the first bit on the left end indicating the oldest generation. If a CoW request is made for the snapshot V-VOL, the corresponding bit in the CoW bitmap is set to "1"; and if no CoW request is made, i.e., if the difference data for the relevant block is already saved in the difference volume D-VOL, the corresponding bit is set to "0." For example, if a CoW request is made for the $m^{th}$ snapshot V-VOL, the $m^{th}$ bit counted from the left end in the CoW bitmap 60A is set to "1."

There are plural sets of block address fields 60B that correspond to the respective snapshots V-VOL associated with their difference volumes D-VOL (storage apparatuses $15_{n+1}$ to $15_{n+m}$). For example, FIG. 9 shows that the $1^{st}$ to $m^{th}$ snapshots V-VOL are associated with the difference volumes D-VOL and that the difference data of these snapshots V-VOL is stored in their corresponding difference volumes D-VOL.

Each block address field 60B stores the block address of the relevant block of the difference volume D-VOL where difference data of the snapshot V-VOL of the relevant generation corresponding to the relevant block of the operational volume P-VOL is saved. However, if the corresponding difference data is not yet saved, the code "NONE," indicating that there is no save destination block address, is stored.

If there is a plurality of storage apparatuses $15_{n+1}$ to $15_{n+m}$ which provide difference volumes D-VOL, a mapping table 61 as shown in FIG. 10, contained in each of the second and any following storage apparatuses $15_{n+1}$ to $15_{n+m}$ has inheritance fields 61C corresponding to the respective blocks of the operational volume P-VOL, in addition to the CoW bitmap fields 61A and plural sets of block address fields 61B.

The inheritance field 61C is the field that stores specified inheritance information for inheriting the content of the previous mapping table 60 or 61. If a "NONE" code is stored in the block address field 60B or 61B associated with the last snapshot V-VOL in the previous mapping table 60 or 61 (snapshot M in FIG. 9 or snapshot N in FIG. 10) (hereafter called "last block address field"), the block address of the relevant block of the difference volume D-VOL which stores the corresponding difference data as described below is stored as the inheritance information.

Specifically speaking, if a "NONE" code is stored in the last block address field 60B or 61B, i.e., if no difference data for the relevant block of the operational volume P-VOL is saved in the snapshot V-VOL, the same block address as the block address that was last stored in any corresponding block address field 61B in the mapping table 61 (in any block address fields 61C on the same row as the target inheritance field 61C in FIG. 10) is stored in the inheritance field 61C; and if any block address other than the "NONE" code is stored in the last block address field 60 or 61, the "NONE" code is stored in the inheritance field 61C.

When the difference data for the block where the "NONE" code is stored in the last block field 60B or 61B in the previous mapping table 60 or 61 is to be read, the inheritance field 61C is referred to. For example, in FIG. 9 and FIG. 10, when the difference data for the block with the block address "2" of the "snapshot M" that is the last snapshot V-VOL of the mapping table 60 in FIG. 9 is to be read, because the "NONE" code is stored in the last block field 60B, the inheritance field 61C of the mapping table 61 in FIG. 10 that is the next mapping table is referred to. As a result, data is read from the block with the block address "100" of the difference volume D-VOL corresponding to this mapping table 61.

(3) Various Processing Performed by the NAS Server System

The following processing executed by the CPU 21 (FIG. 4) of the NAS server system 13 (FIG. 4) in the storage system 10 (FIG. 4) will be described below in detail: processing for writing data to the operational volume P-VOL; processing for reading data from the operational volume P-VOL; processing for creating a new snapshot V-VOL; processing for deleting the created snapshot V-VOL; difference volume D-VOL switching processing; difference volume D-VOL disconnection processing; and processing for connecting, or resuming the operation of, a stopped difference volume D-VOL.

(3-1) Data Write Processing

First, the details of processing executed by the CPU 21 for writing data to the operational volume P-VOL are described below.

Figure 11:
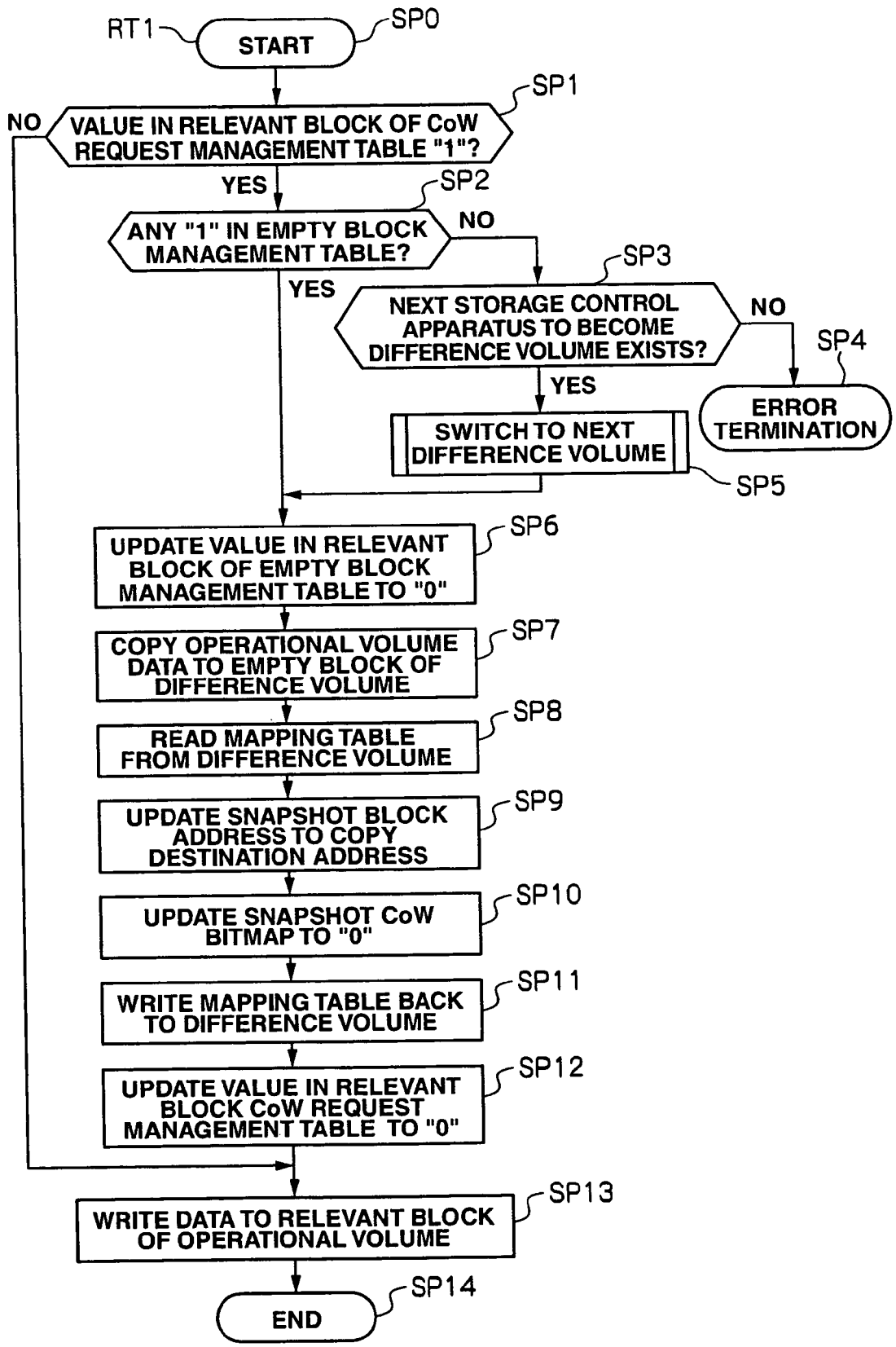
FIG. 11 is a flowchart illustrating write processing.
Figure 12:
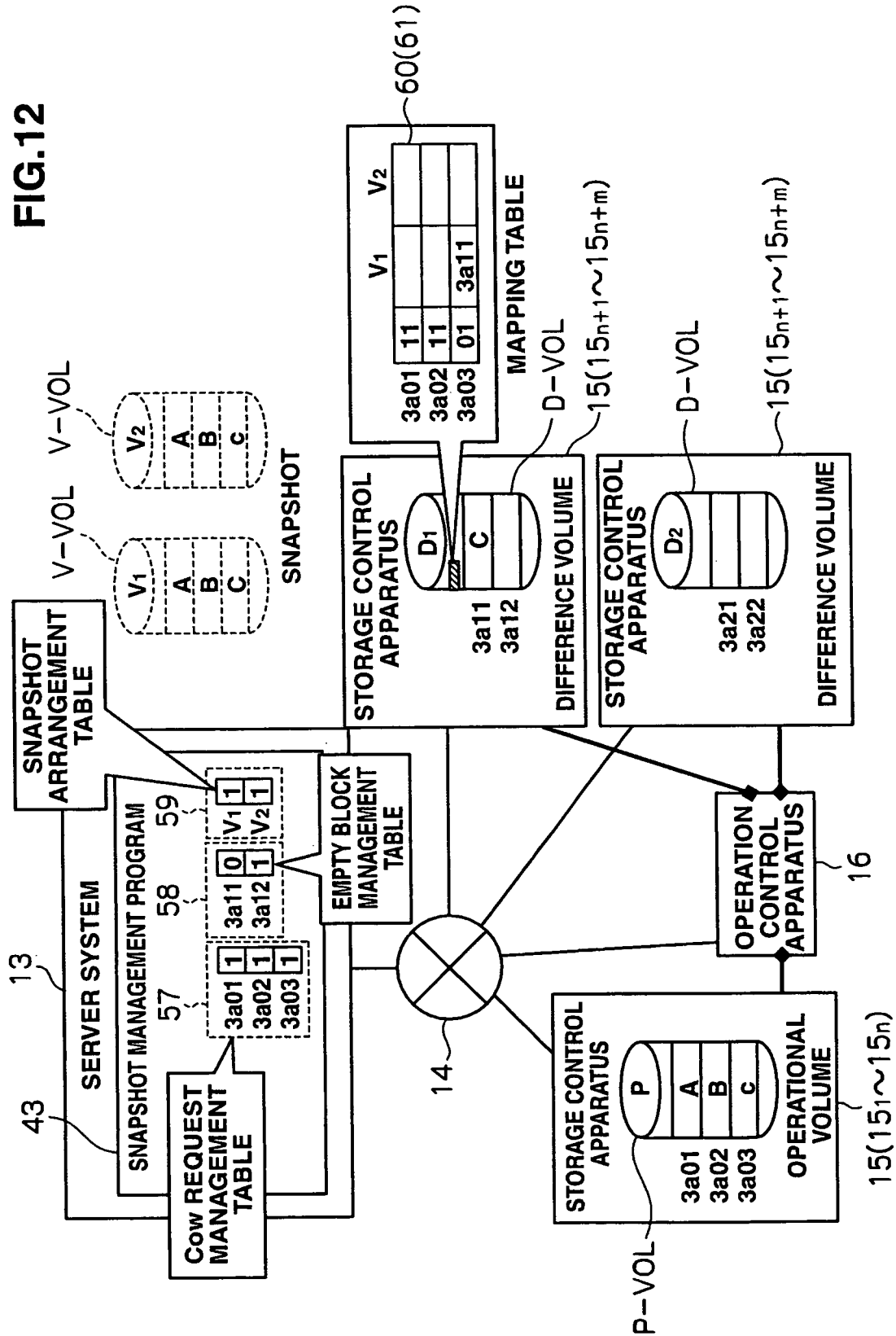
FIG. 12 is a conceptual diagram that explains the write processing.
Figure 13:
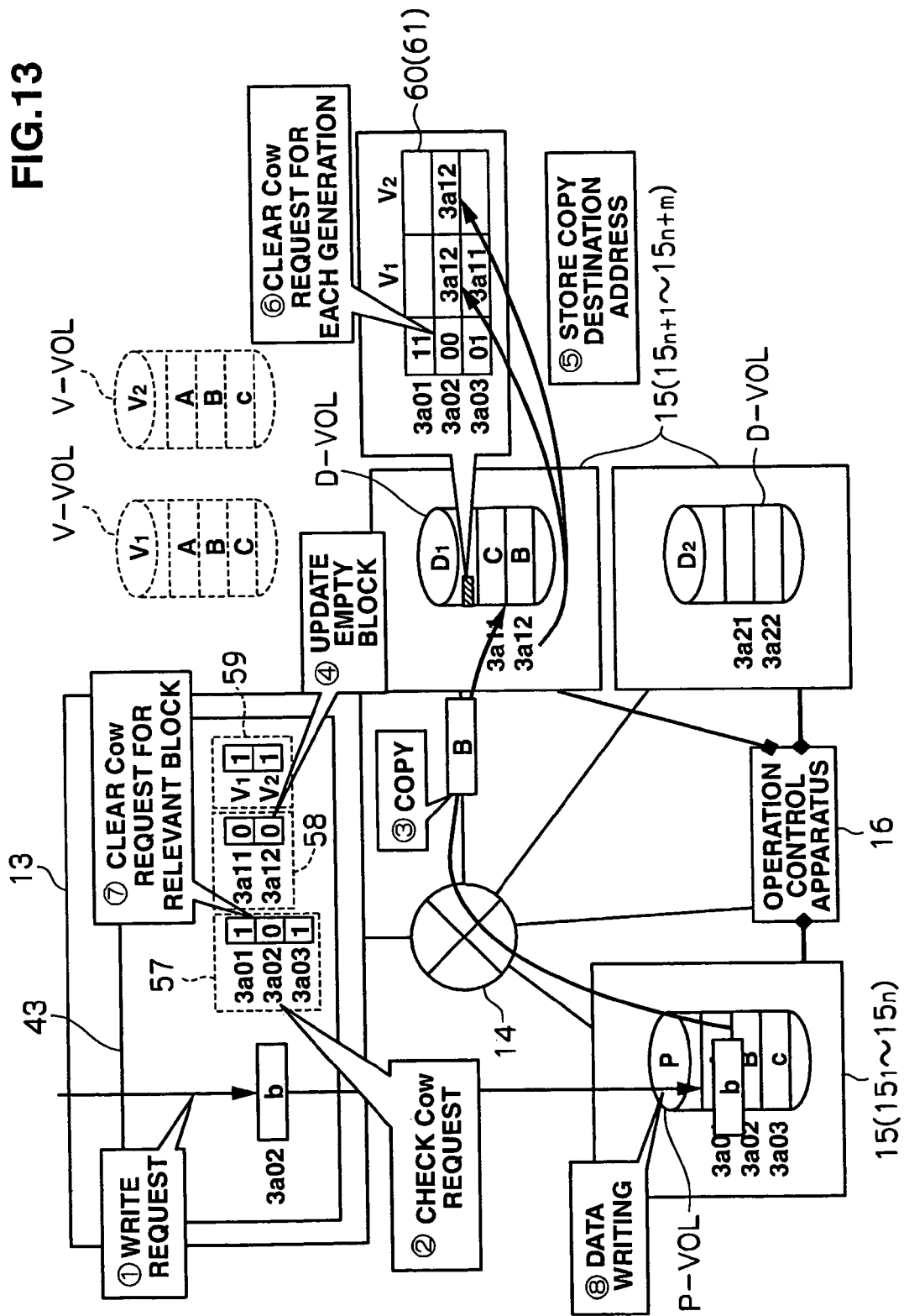
FIG. 13 is a conceptual diagram that explains the write processing.

FIG. 11 is a flowchart explaining a processing sequence executed by the NAS server system 13 CPU 21 when the NAS server system 13 having the configuration described above receives a request from the client apparatus 11 (FIG. 4) to write data to the operational volume P-VOL. FIG. 12 shows the storage system 10 in its initial state at a certain time point in time. FIG. 13 shows a processing sequence for writing data to the operational volume P-VOL in response to a request from the client apparatus 11. The CPU 21 executes this data write processing according to the write processing subprogram 50 (FIG. 5) of the snapshot management program 43 (FIG. 5).

When the CPU 21 receives a data write request, it starts the data write processing (SP0) and first judges whether or not the value "1" is stored in the CoW request field 57A in the CoW request management table 57 of the snapshot management program 43 (FIGS. 5 and 6), corresponding to the block designated as the data write destination of the operational volume P-VOL (hereinafter referred to as the "data write destination block") (SP1).

If the judgment result is "NO" (SP1: NO), the CPU 21 proceeds to step SP13. On the other hand, if the judgment result in SP1 is "YES" (SP1: YES), the CPU 21 refers to the empty block management table 58 of the snapshot management program 43 (FIGS. 5 and 7) and then judges whether or not the currently used difference volume D-VOL ($D_1$ in FIG. 13) has enough empty blocks to save the difference data stored in the data write destination block (SP2).

If the judgment result is "YES" (SP2: YES), the CPU 21 stores "0" in the usage status field 58A of the empty block management table 58 associated with the block in which the difference data in the difference volume D-VOL (SP6) is to be saved (SP6). The CPU 21 then sends the data in the data write destination block as the difference data, together with the data write request, to the corresponding storage apparatus $15_{n+1}$ to $15_{n+m}$, and has that storage apparatus copy (or save) the difference data to the corresponding block of the difference volume D-VOL (SP7).

Next, the CPU 21 issues a read request to that relevant storage apparatus $15_{n+1}$ to $15_{n+m}$ to read the mapping table 60 or 61, and has that storage apparatus read the mapping table 60 or 61 stored in the relevant difference volume D-VOL (SP8). Subsequently, the CPU 21 updates the address in the block address field 60B or 61B of the mapping table 60 or 61, corresponding to the current snapshot V-VOL—i.e., the block address field 60B or 61B corresponding to the data write destination block of the operational volume P-VOL—to the block address of the block of the difference volume D-VOL to which the difference data was copied in step SP7 (SP9).

In doing so, the CPU 21 refers to the corresponding CoW bitmap field 60A or 61A in the relevant mapping table 60B or 61B. If there is any preceding snapshot V-VOL that is older than the current snapshot V-VOL and whose corresponding bit in the CoW bitmap is "1", the CPU 21 also updates the address in the block address field 60B or 61B of the mapping table 60 or 61, corresponding to that snapshot V-VOL—i.e., the block address field 60B or 61B corresponding to the data write destination block of the operational volume P-VOL—to the block address of the block of the difference volume D-VOL to which the difference data was copied in step SP7 (SP9).

Next, the CPU 21 updates all the bits of the CoW bitmap in the mapping table 60 or 61, corresponding to the data write destination block of the operational volume P-VOL, to "0" (SP10), and writes the mapping table 60 or 61 back to the difference volume D-VOL where it originally belonged (SP11).

Subsequently, the CPU 21 updates the bits stored in the relevant CoW request fields 57A in the CoW request management table 57 in the snapshot management program 43, to "0" (SP12), and writes the write data to the corresponding block of the operational volume P-VOL (SP13). Then the CPU 21 terminates the write processing (SP14).

On the other hand, if the judgment result in step SP2 is "NO" (SP2: NO), the CPU 21 judges whether or not the next storage apparatus $15_{n+1}$ to $15_{n+m}$ for the snapshot service exists (SP3). If the judgment result is "NO" (SP3: NO), the CPU 21 executes error processing by, for example, making an error report to the client apparatus 11 that sent the data write request, and then terminates this data write processing (error termination) (SP4). In this case, the operation of the snapshot V-VOL function can no longer be continued.

Figure 14:
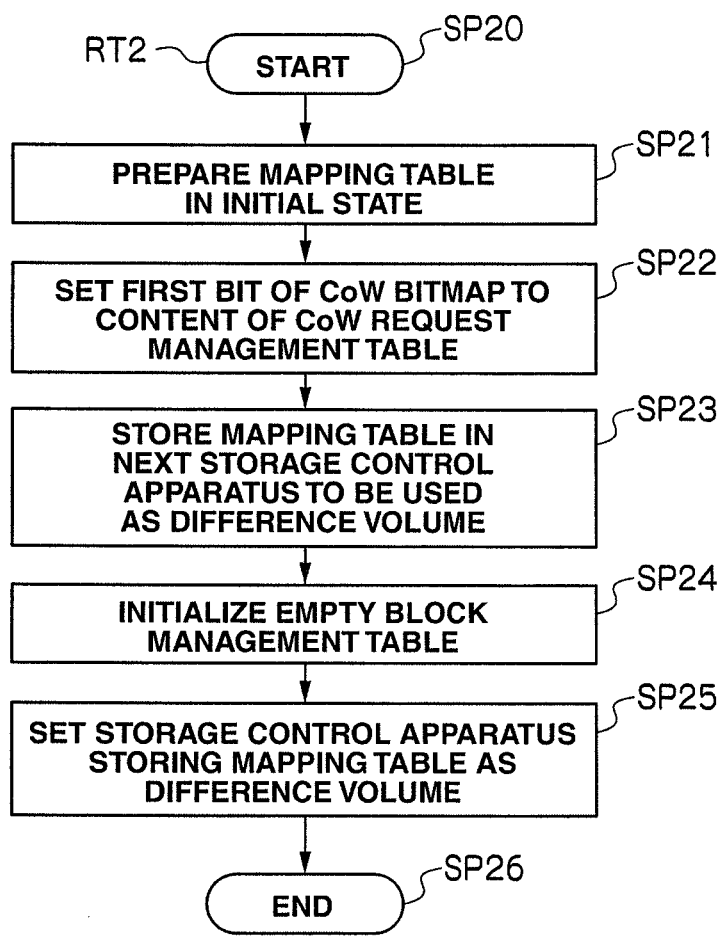
FIG. 14 is a flowchart that explains difference volume switching processing.
Figure 15:
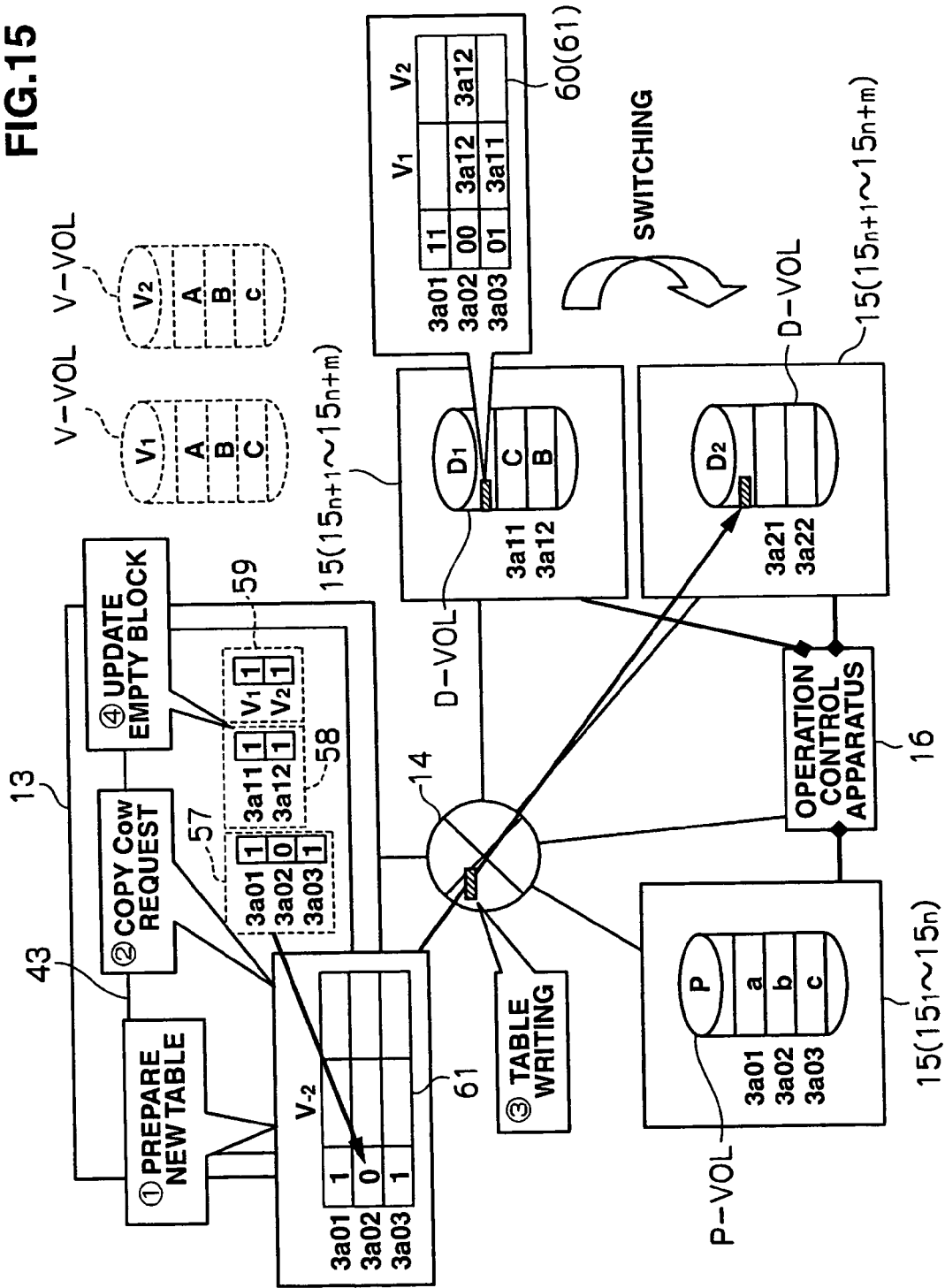
FIG. 15 is a conceptual diagram explaining difference volume switching processing.

On the other hand, if the judgment result in step SP3 is "YES" (SP3: YES), the CPU 21 switches from the currently used difference volume D-VOL ($D_1$ in FIG. 13) to the next difference volume D-VOL ($D_2$ in FIG. 13) via the sequences indicated in FIGS. 14 and 15, according to the difference volume switching subprogram 54 of the snapshot management program 43.

Specifically speaking, if the judgment result in step SP3 of the data write processing (FIG. 11) is "YES", the CPU 21 starts difference volume switching processing (SP20) and first prepares the mapping table 61 in its initial state with the inheritance fields 61C described above in FIG. 10 (SP21).

Next, the CPU 21 copies the values stored in the corresponding CoW request fields 57A in the CoW request management table 57 to the respective first bits of the CoW bitmaps stored in all the CoW bitmap fields 61A of the mapping table 61 (SP22).

Subsequently, the CPU 21 stores that mapping table 61 in the difference volume D-VOL of the next storage apparatus $15_{n+1}$ to $15_{n+m}$ providing the snapshot service (SP23) and then initializes the empty block management table 58 (SP24).

Moreover, the CPU 21 sets the difference volume D-VOL of that storage apparatus $15_{n+1}$ to $15_{n+m}$ that stored the mapping table 61 in step SP23, as the difference volume D-VOL to be used next (SP25) and then terminates this difference volume switching processing (SP26).

Figure 16:
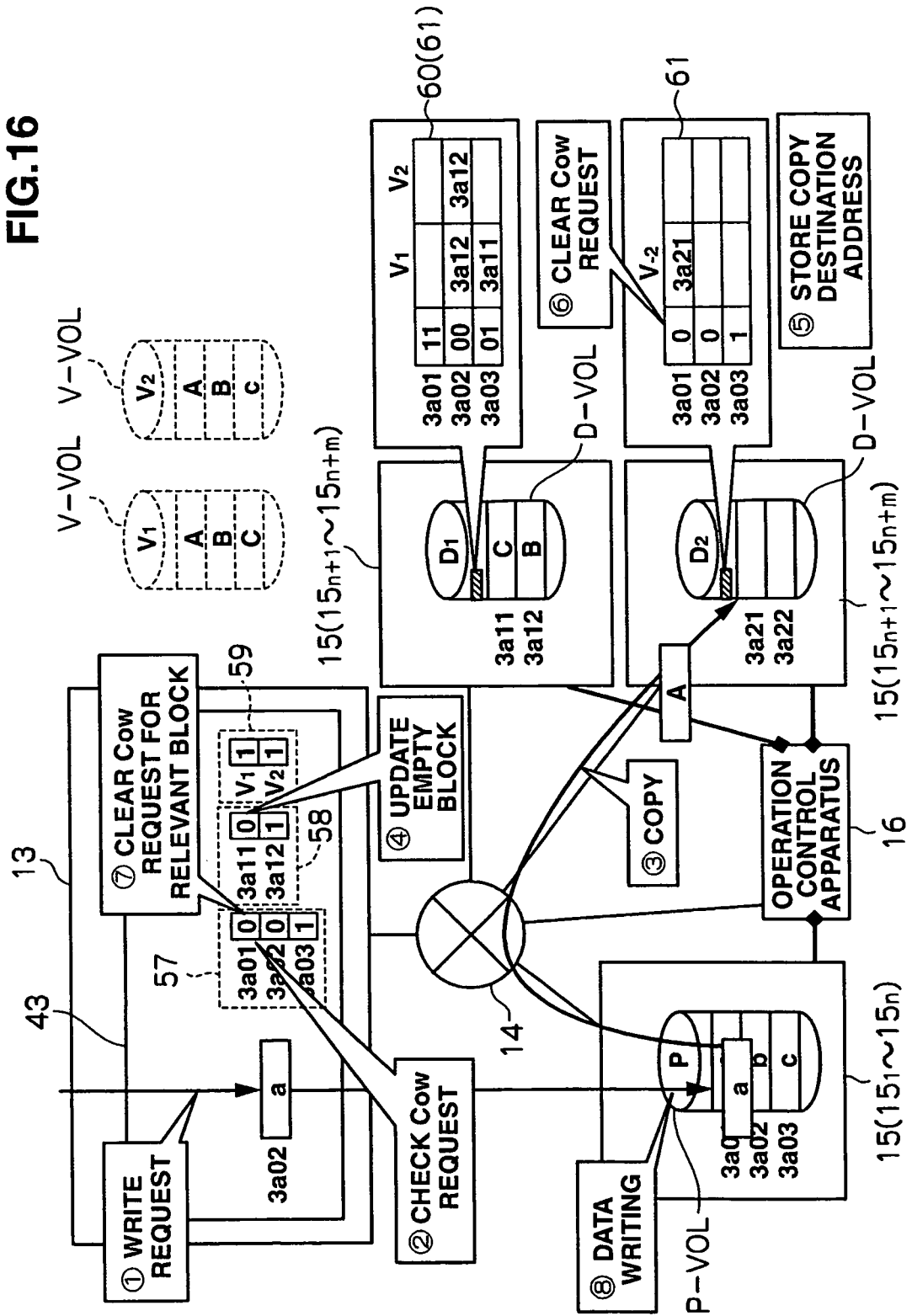
FIG. 16 is a conceptual diagram explaining difference volume switching processing.

The CPU 21 returns to the data write processing (FIG. 11) and executes the processing of steps SP6 to SP14 as described above. Therefore, after the termination of the difference volume switching processing, the difference data will be saved in the newly switched difference volume D-VOL ($D_2$ in FIG. 16) as shown in FIG. 16.

(3-2) Data Read Processing

The details of processing executed by the CPU 21 for reading data are explained below.

Figure 17:
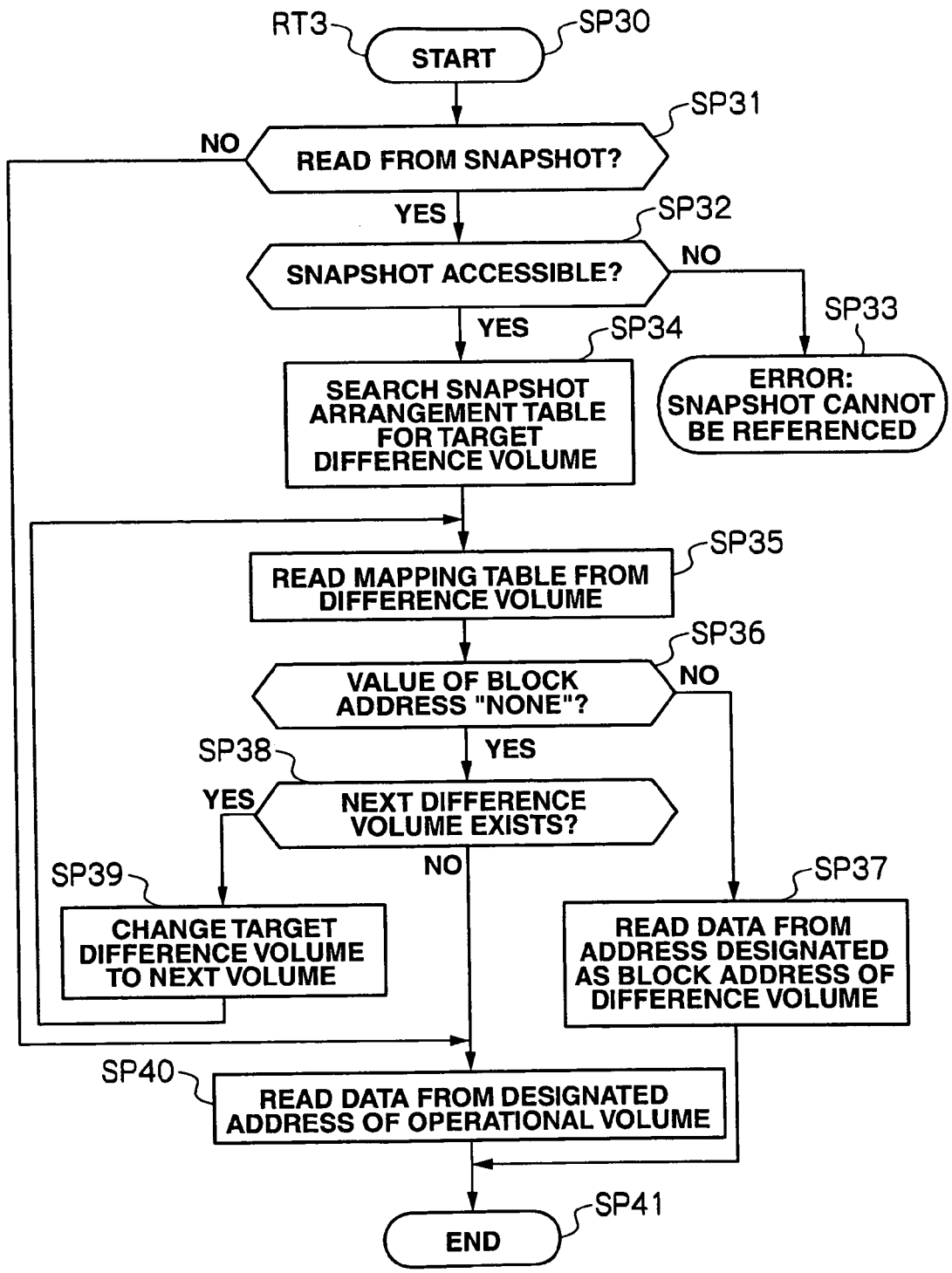
FIG. 17 is a flowchart showing read processing.
Figure 18:
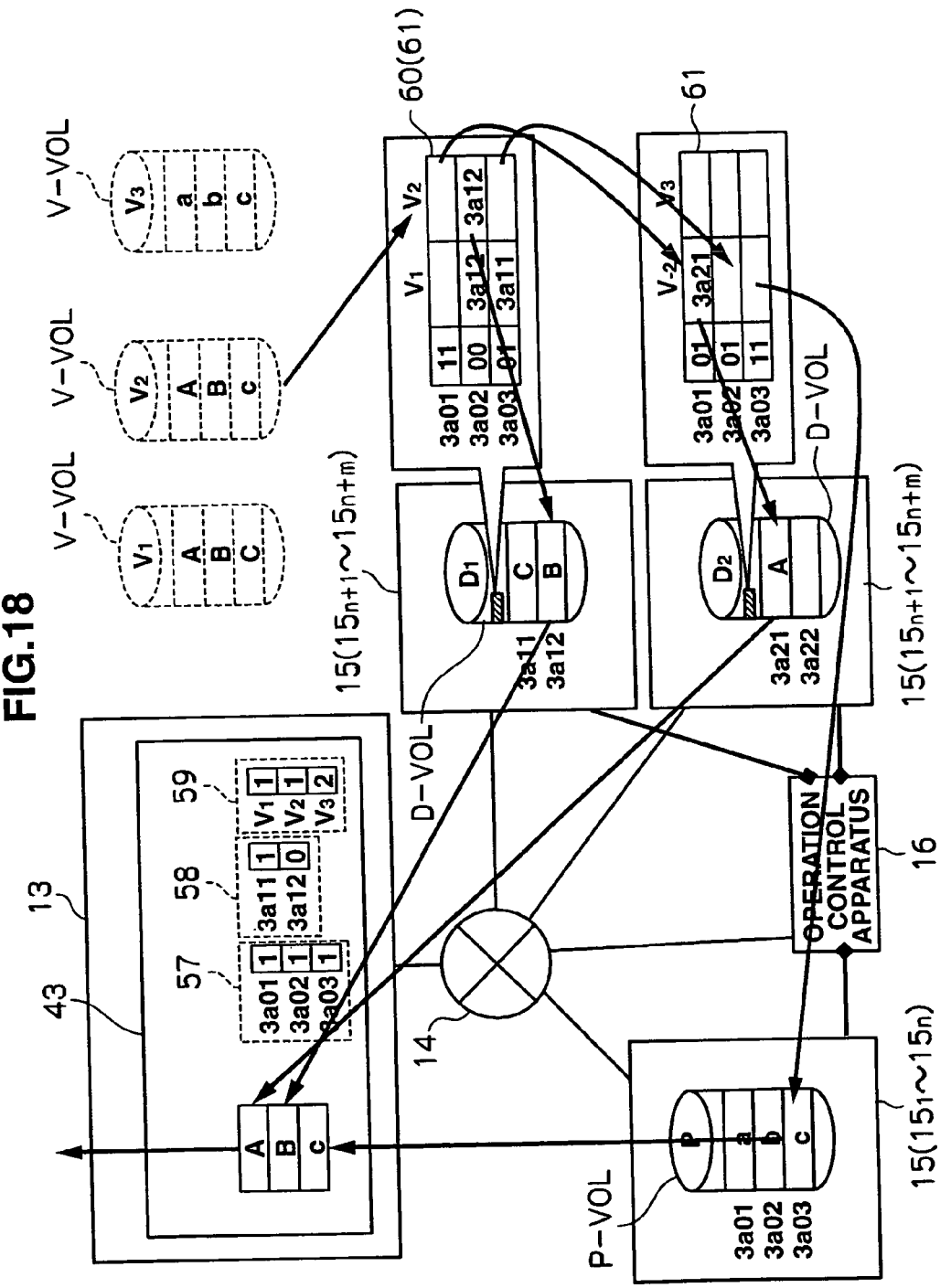
FIG. 18 is a conceptual diagram that explains the read processing.

FIG. 17 is a flowchart showing the details of processing executed by the CPU 21 of the NAS server system 13 upon receiving a data read request. FIG. 18 shows the processing sequence executed by the CPU 21 where the target read data is the data of a snapshot V-VOL. The CPU 21 executes this data read processing according to the read processing program 51 (FIG. 5) of the snapshot management program 43 (FIG. 5).

Specifically speaking, when the CPU 21 receives a data read request, it starts the processing for reading the data (SP30) and first judges whether or not the request is made to read data from one of the snapshots V-VOL (SP31).

If the judgment result is "NO" (SP31: NO), the CPU 21 proceeds to step SP40. On the other hand, if the judgment result is "YES" (SP31: YES), the CPU 21 then judges whether or not the relevant snapshot V-VOL is accessible based on, for example, its internal settings and the existence of any failure. (SP32).

If the judgment result is "NO" (SP32: NO), the CPU 21 terminates this read processing abnormally (error termination) (SP33). On the other hand, if the judgment result is "YES" (SP32: YES), the CPU 21 searches for the target difference volume by using the snapshot arrangement table 59 of the snapshot management program 43 (FIG. 8) (SP34). The CPU 21 then issues a request to read the mapping table 60 or 61 (FIG. 9 or FIG. 10) stored in the target difference volume V-VOL found by the above search, to the relevant storage apparatus $15_{n+1}$ to $15_{n+m}$ storing that difference volume V-VOL, and has that storage apparatus read the mapping table 60 or 61 (SP35).

Subsequently, the CPU 21 judges whether or not the data stored in the block address field 60B or 61B of the mapping table 60 or 61 obtained as described above, corresponding to the block of the operational volume P-VOL storing the target data, is "NONE". (SP36).

If the judgment result is "NO" (SP36: NO), it means that the designated data is saved as the difference data in the difference volume D-VOL found as the result of the search in step SP34, at the time of creation of the relevant snapshot V-VOL. Therefore, the CPU 21 issues a data read request to the corresponding storage apparatus $15_{n+1}$ to $15_{n+m}$, and then has that storage apparatus read the data from the relevant block of the difference volume D-VOL with the block address stored in the above-mentioned block address field 60B or 61B (SP37).

Then, the CPU 21 terminates this read processing (SP41).

On the other hand, if the judgment result in step 36 is "YES" (SP36: YES), it means that the designated data is not saved in the difference volume D-VOL found as a result of the search in step SP34, at the time of creation of the relevant snapshot V-VOL. Therefore, the CPU 21 judges whether or not the next difference volume D-VOL exists (SP38), for example, according to the snapshot arrangement table 59 (FIG. 8) (SP38).

If the judgment result is "YES" (SP38: YES), the CPU 21 changes the target difference volume D-VOL to the next difference volume D-VOL (SP39) and then returns to step SP35. In the same way, the CPU 21 repeats the same processing until the judgment result becomes "NO" in step SP36 or SP38 (processing sequence: SP35→SP36→SP38→SP39→SP35).

On the other hand, if the judgment result in step SP38 is "NO" (SP38: NO), it means that no data was written by a user to the relevant block of the operational volume P-VOL where the corresponding data is stored, i.e., no data from the corresponding block of the operational volume P-VOL was saved, from the start of the creation of the corresponding snapshot V-VOL until the start of the creation start time of the current snapshot V-VOL. As a result, the CPU 21 issues a data read request to the corresponding storage apparatus $15_1$ to $15_n$ to read data from the corresponding block of the operational volume P-VOL, and has that storage apparatus read the data (SP40). Then, the CPU 21 terminates this data read processing (SP41).

The difference data read from the difference volume D-VOL in step 37 of this read processing and the data read from the operational volume P-VOL in step SP40 will be sent to the corresponding client apparatus 11 later by the processing executed by the CPU 21 according to the file server program 40.

(3-3) Snapshot Creation Processing

Figure 19:
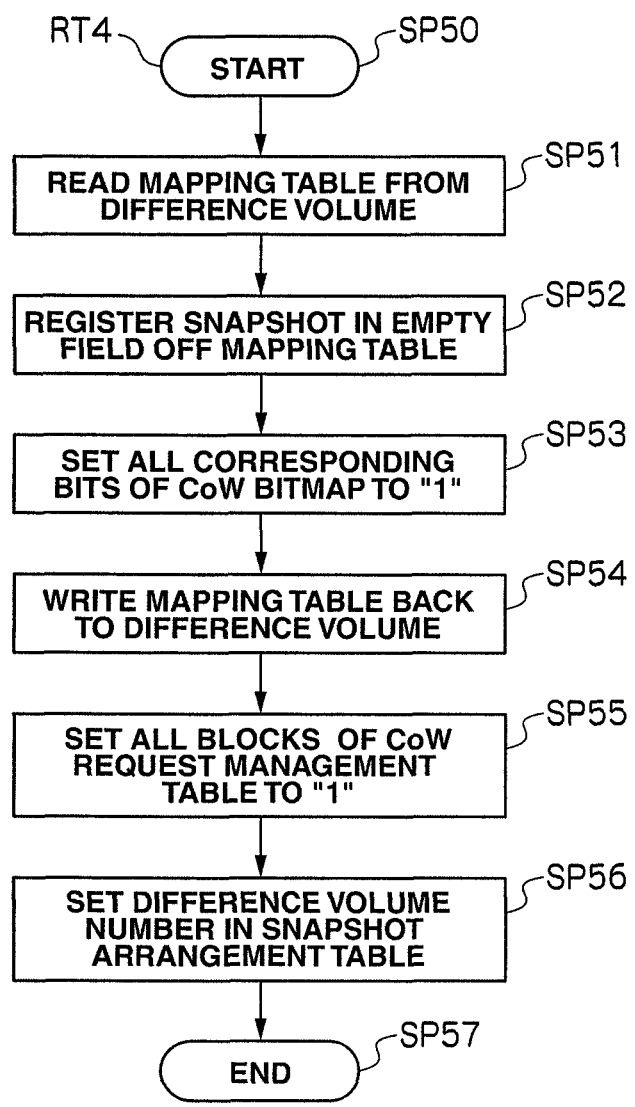
FIG. 19 is a flowchart showing snapshot creation processing.
Figure 20:
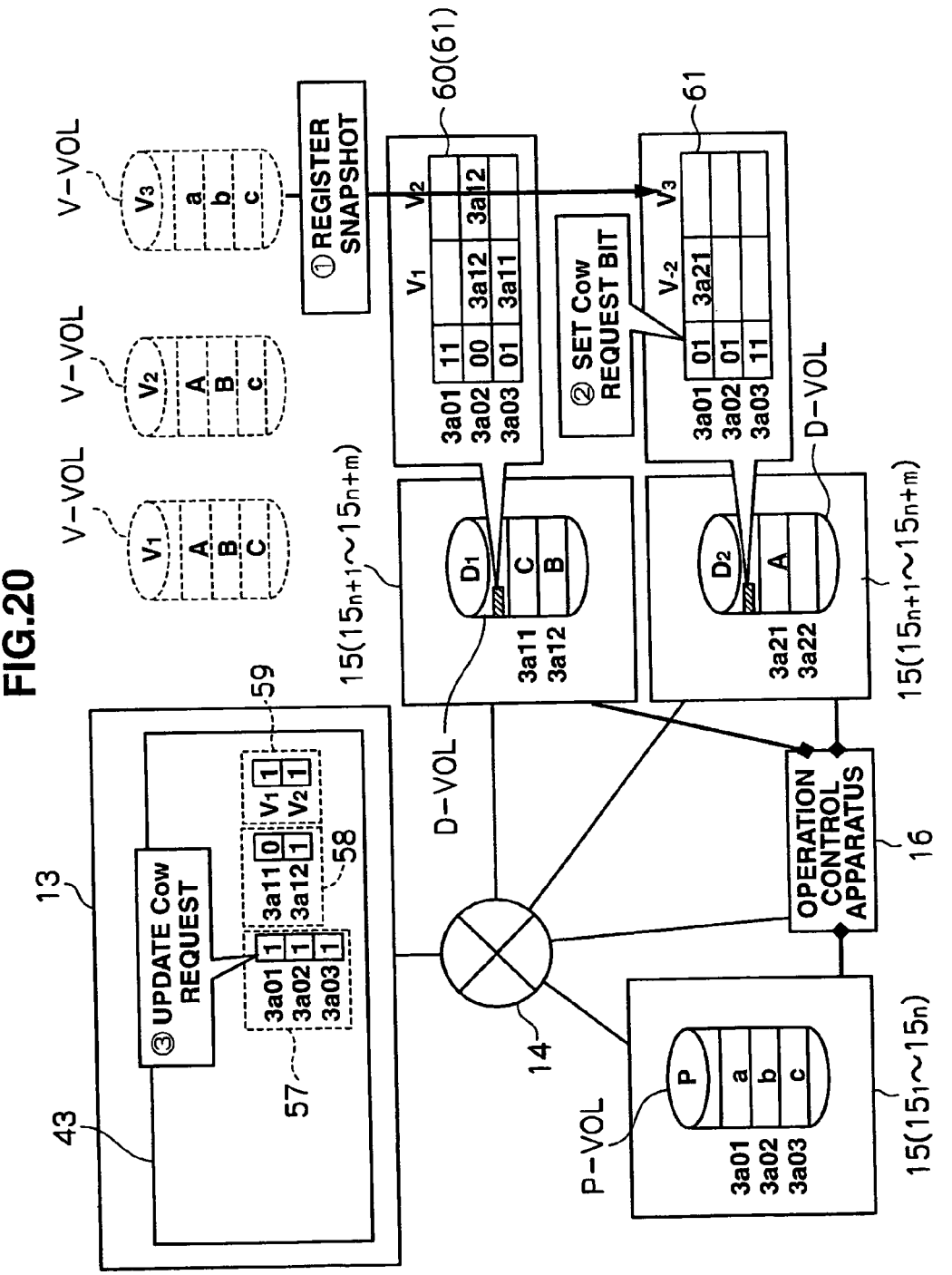
FIG. 20 is a conceptual diagram that explains the snapshot creation processing.

FIG. 19 is a flowchart showing the details of processing executed by the CPU 21 for creating a snapshot V-VOL and FIG. 20 shows the sequence of this snapshot creation processing. The CPU 21 executes the snapshot creation processing according to the write processing subprogram 50 (FIG. 5) of the snapshot management program 43 (FIG. 5).

Specifically speaking, when the CPU 21 receives an instruction to create a snapshot V-VOL from the client apparatus 11, it starts this snapshot creation processing (SP50), and first issues a request to the relevant storage apparatus $15_{n+1}$ to $15_{n+m}$ storing the current difference volume D-VOL ($D_1$ in FIG. 20) to read the mapping table 60 or 61 (FIG. 9 or 10) and has that storage apparatus read the mapping table 60 or 61 from the difference volume D-VOL (SP51).

Next, the CPU 21 registers a new snapshot V-VOL in the empty fields of the read mapping table 60 or 61 (SP52). Specifically speaking, the CPU 21 secures the block address fields 60B or 61B on the mapping table 60 or 61 by associating them with the respective blocks of the operational volume P-VOL.

The CPU 21 then sets all the bits, corresponding to the new snapshot V-VOL, of the CoW bitmaps stored in the respective CoW bitmap fields 60A or 61A in the mapping table 60 or 61, to "1" (SP53), and then sends this mapping table 60 or 61 to the corresponding storage apparatus $15_{n+1}$ to $15_{n+m}$, and has that storage apparatus write the mapping table 60 and 61 back to the difference volume D-VOL where it originally belonged (SP54).

Subsequently, the CPU 21 sets the values stored in the respective CoW request fields 57A of the CoW request management table 57 of the snapshot management program 43, to "1" (SP55) and then sets the difference volume number of the current difference volume D-VOL in the corresponding difference volume number field 59A of the snapshot arrangement table 59 (FIG. 8) of the snapshot management program 43 (SP56). Then the CPU 21 terminates the snapshot creation processing (SP57).

(3-4) Snapshot Deletion Processing

Figure 21:
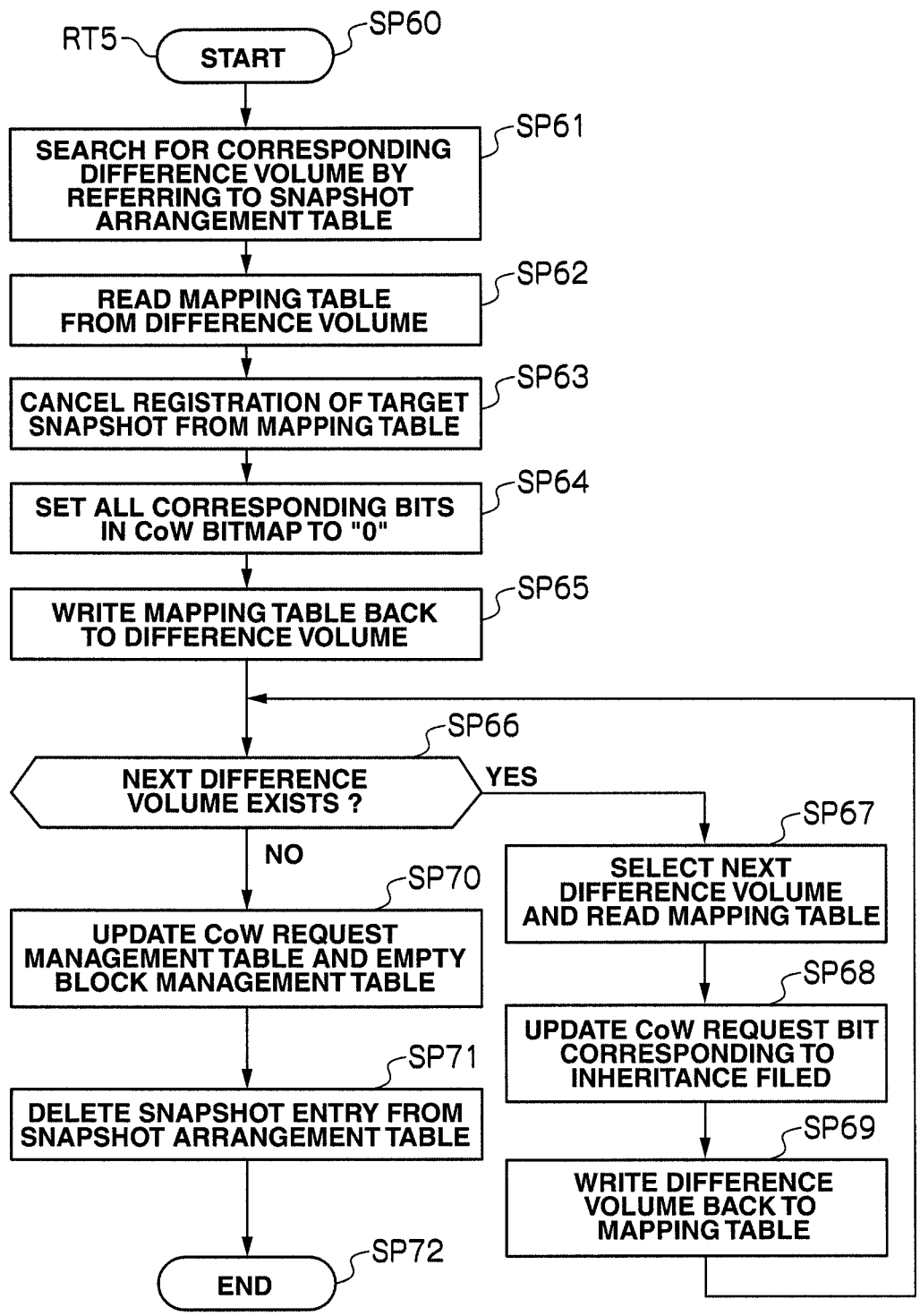
FIG. 21 is a flowchart showing snapshot deletion processing.

FIG. 21 is a flowchart showing the details of processing executed by the CPU 21 for deleting a snapshot. When the CPU 21 receives an instruction to delete a snapshot V-VOL from the client apparatus 11 (FIG. 4), it executes the processing for deleting the designated snapshot V-VOL by following the processing sequence shown in this flowchart according to the snapshot deletion processing subprogram 53 (FIG. 5) of the snapshot management program 43 (FIG. 5).

Specifically speaking, when the CPU 21 receives an instruction to delete a snapshot V-VOL, it starts the snapshot deletion processing (SP60) and first refers to the snapshot arrangement table 59 in the snapshot management program 43 (FIG. 8) and detects the relevant difference volume D-VOL storing the difference data of the designated snapshot V-VOL (SP61).

Next, the CPU 21 issues a request to read the mapping table 60 or 61 (FIG. 9 or FIG. 10), to the relevant storage apparatus $15_{n+1}$ to $15_{n+m}$ providing the detected difference volume D-VOL, and then has that storage apparatus read this mapping table 60 or 61 from the difference volume D-VOL (SP62). Subsequently, the CPU 21 cancels the registration of the deletion target snapshot V-VOL from the mapping table 60 or 61 (SP63). Specifically speaking, the CPU 21 deletes all the data concerning the deletion target snapshot V-VOL from the mapping table 60 or 61.

Next, the CPU 21 sets the bits, corresponding to the deletion target snapshot V-VOL, in the respective CoW bitmaps stored in the CoW bitmap fields 60A or 61A of the mapping table 60 or 61, to "0" (SP64), and then sends the mapping table 60 or 61 to the corresponding storage apparatus $15_{n+1}$ to $15_{n+m}$, and has that storage apparatus write the mapping table 60 or 61 back to the difference volume D-VOL where it originally belonged (SP65).

Then, the CPU 21 judges whether or not the next difference volume D-VOL newer than the above difference volume D-VOL exists, according to the snapshot arrangement table 59 (SP66). If the deletion target snapshot V-VOL is not the newest one, the judgment result in step SP66 is "YES" (SP66: YES). Accordingly, the CPU 21 issues a request to read the mapping table 61 to the relevant storage apparatus $15_{n+1}$ to $15_{n+m}$ storing that next difference volume D-VOL, and then has that storage apparatus read this mapping table 61 from the difference volume D-VOL (SP67).

Subsequently, the CPU 21 updates the block addresses stored in the inheritance fields 61C of this mapping table 61 as necessary (SP68) and then sends this mapping table 61 to the corresponding storage apparatus $15_{n+1}$ to $15_{n+m}$ and has that storage apparatus write the mapping table 61 back to the difference volume D-VOL where it originally belonged (SP69). Then, the CPU 21 repeats the same processing sequentially for any newer difference volumes D-VOL until all the related mapping tables 61 are updated (from SP66 to SP69 and then back to SP66).

When all the related mapping tables 60 and 61 have been updated and the judgment result in step SP66 becomes "NO" (SP66: NO), the CPU 21 updates the CoW request management table 57 and the empty block management table 58 of the snapshot management program 43 (SP70). Specifically speaking, regarding the CoW request management table 57, the CPU 21 implements a logical OR operation of all the bits of the CoW bitmap in each updated mapping table 60 or 61, corresponding to each block of the operational volume P-VOL, and stores the results of the logical OR operation in the corresponding CoW request fields 57A of the CoW request management table 57. Concerning the empty block management table 58, the CPU 21 changes the value stored in the usage status fields 58A corresponding to the block of the difference volume D-VOL storing the difference data of the deletion target snapshot V-VOL from "0" to "1."

Subsequently, the CPU 21 deletes the entry of the deletion target snapshot V-VOL from the snapshot arrangement table 59 (SP71) and then terminates this snapshot deletion processing (SP72).

(3-5) Difference Volume Disconnection Processing

In the storage system 10 according to this embodiment, if no access is made to a certain difference volume D-VOL for a certain period of time, or if a server administrator gives a disconnection instruction, or if any failure occurs, settings are made so that all the snapshots associated with the target difference volume D-VOL and any other preceding difference volumes D-VOL become inaccessible, and then the operation of the storage apparatuses $15_{n+1}$ to $15_{n+m}$ providing these difference volumes D-VOL is stopped. However, the operational volume P-VOL or the difference volume D-VOL where the current difference data is saved cannot be disconnected.

Figure 22:
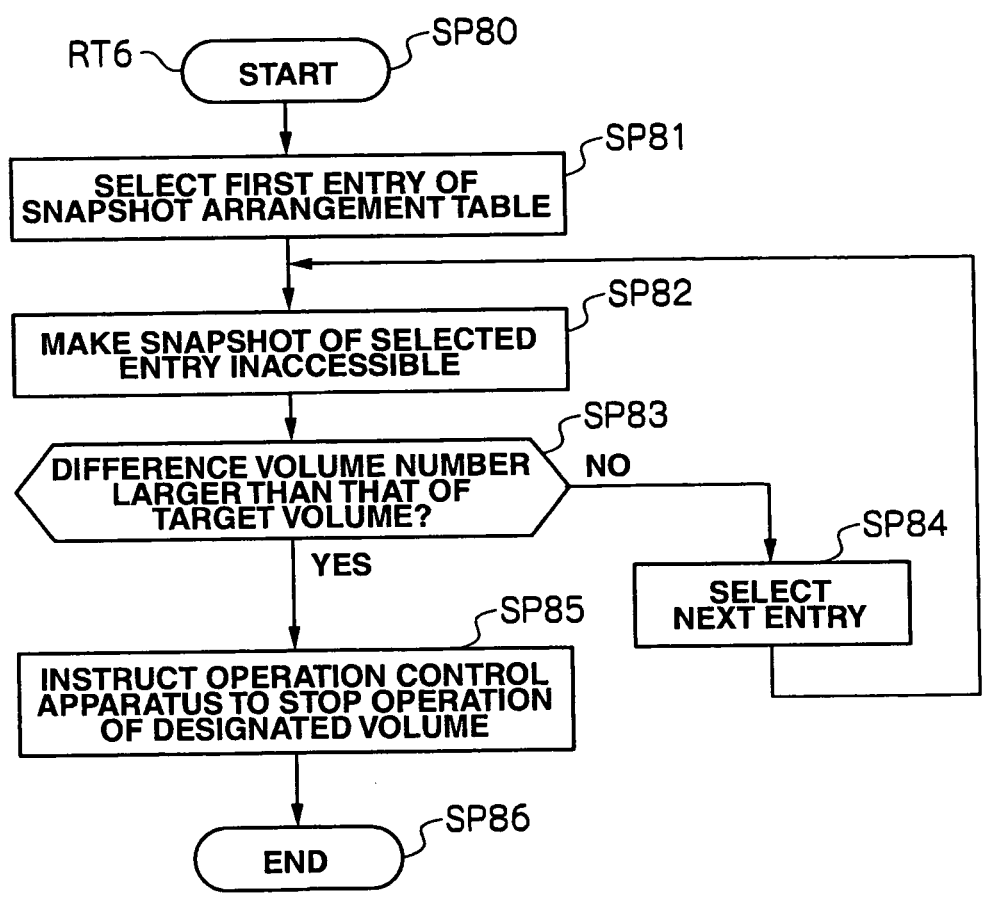
FIG. 22 is a flowchart showing difference volume disconnection processing.
Figure 23:
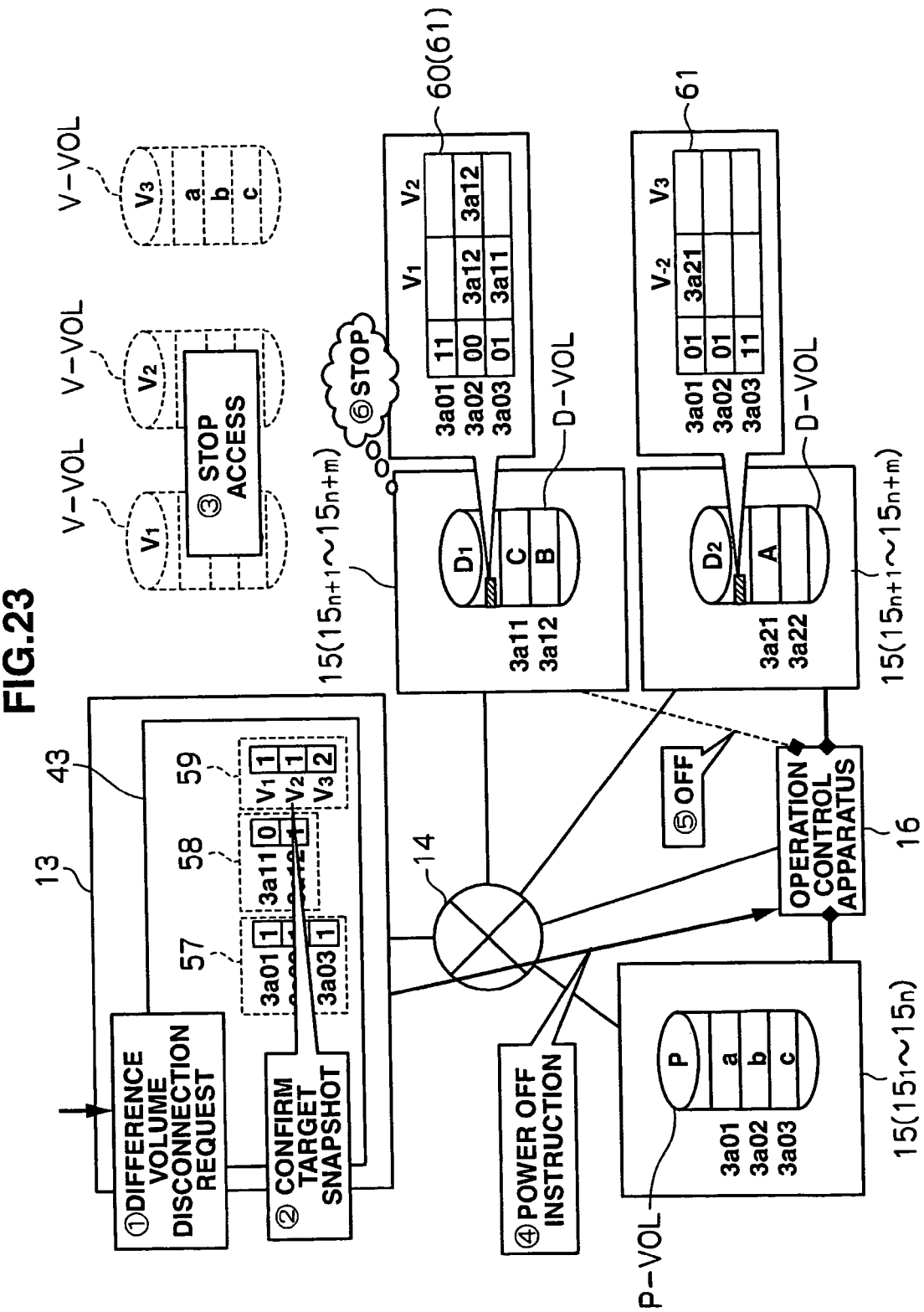
FIG. 23 is a conceptual diagram that explains the difference volume disconnection processing.

FIG. 22 is a flowchart showing the details of processing executed by the CPU 21 of the NAS server system for disconnecting a difference volume. FIG. 23 shows the sequence of the difference volume disconnection processing. The CPU 21 executes the difference volume disconnection processing by following the sequence shown in this flowchart according to the difference volume stop subprogram 55 of the snapshot management program 43 (FIG. 5).

Specifically speaking, when any difference volume D-VOL other than the current difference volume D-VOL enters a specified state where it could be disconnected (i.e., where the relevant storage apparatus $15_{n+1}$ to $15_{n+m}$ providing that difference volume D-VOL could have its operation stopped), for example, if no access is made to the difference volume D-VOL for a certain period of time, or if the server administrator gives a disconnection instruction, or if any failure occurs, the CPU 21 starts the difference volume disconnection processing (SP80), selects the first entry of the snapshot arrangement table 59 (FIG. 8) in the snapshot management program 43 (SP81), and then makes internal settings so that the snapshot V-VOL of this entry becomes inaccessible (SP82).

Subsequently, the CPU 21 judges whether or not the difference volume number of the difference volume D-VOL associated with the inaccessible snapshot V-VOL is larger than the difference volume number of the target difference volume D-VOL (SP83). The "target difference volume D-VOL" means the difference volume D-VOL that is associated with the snapshot V-VOL not accessed for a certain period of time, or for which the server administrator instructed disconnection, or that is provided by the relevant storage apparatus $15_{n+1}$ to $15_{n+m}$ where the failure occurred. If the judgment result is "NO" (SP83: NO), the CPU 21 selects the next entry on the snapshot management table 43 (SP84) and then repeats the same processing sequence for this entry and any subsequent entries (from SP82 to SP84 and then back to SP82).

When the internal settings have been made so that all the entries of the snapshots V-VOL from the first registered entry to the entry associated with the target difference volume D-VOL on the snapshot arrangement table 59 have become inaccessible and the judgment result in step SP83 becomes "YES" (SP83: YES), the CPU 21 gives an instruction to the operation control apparatus 16 (FIG. 4) to disconnect all the difference volumes D-VOL, from the difference volume D-VOL with the difference volume number "1" to the target difference volume D-VOL, i.e., to stop the operation of the respective storage apparatuses $15_{n+1}$ to $15_{n+m}$ providing these difference volumes D-VOL (SP85).

As a result, the operation control apparatus 16 controls, and stops the operation of, these storage apparatuses $15_{n+1}$ to $15_{n+m}$. "To stop the operation" includes not only stopping by physical power-off, but also stopping by the disconnection of paths. For example, in a case where the storage apparatuses $15_{n+1}$ to $15_{n+m}$ are respectively placed in different chassis, their operation can be stopped by turning off the power for each chassis or by disconnecting their paths. Also, in a case where the respective storage apparatuses $15_{n+1}$ to $15_{n+m}$ are placed together in the same chassis and each storage apparatus is equipped with a power supply like a blade server, their operation can be stopped in the same way as where the storage apparatuses $15_{n+1}$ to $15_{n+m}$ are respectively placed in different chassis. If the storage apparatuses $15_{n+1}$ to $15_{n+m}$ are placed together in the same chassis and share the same power supply, they can be made inaccessible due to, for example, disconnection of paths.

Then the CPU 21 terminates the difference volume disconnection processing (SP86).

(3-6) Difference Volume Activation Processing

In order to resume the operation of the difference volume D-VOL that was disconnected as described above in the situation where, for example, an access is made to the disconnected difference volume D-VOL or the server administrator instructs the resumption of the operation, the CPU 21 executes the difference volume activation processing, in the reverse processing sequence of the difference volume disconnection processing, by instructing the operation control apparatus 16 to activate the relevant difference volumes D-VOL to resume their operation, and then making settings so that the snapshots V-VOL associated with the target difference volume D-VOL become accessible. When any difference volume D-VOL newer than the target difference volume D-VOL is not in operation, the snapshots V-VOL remain inaccessible.

Figure 24:
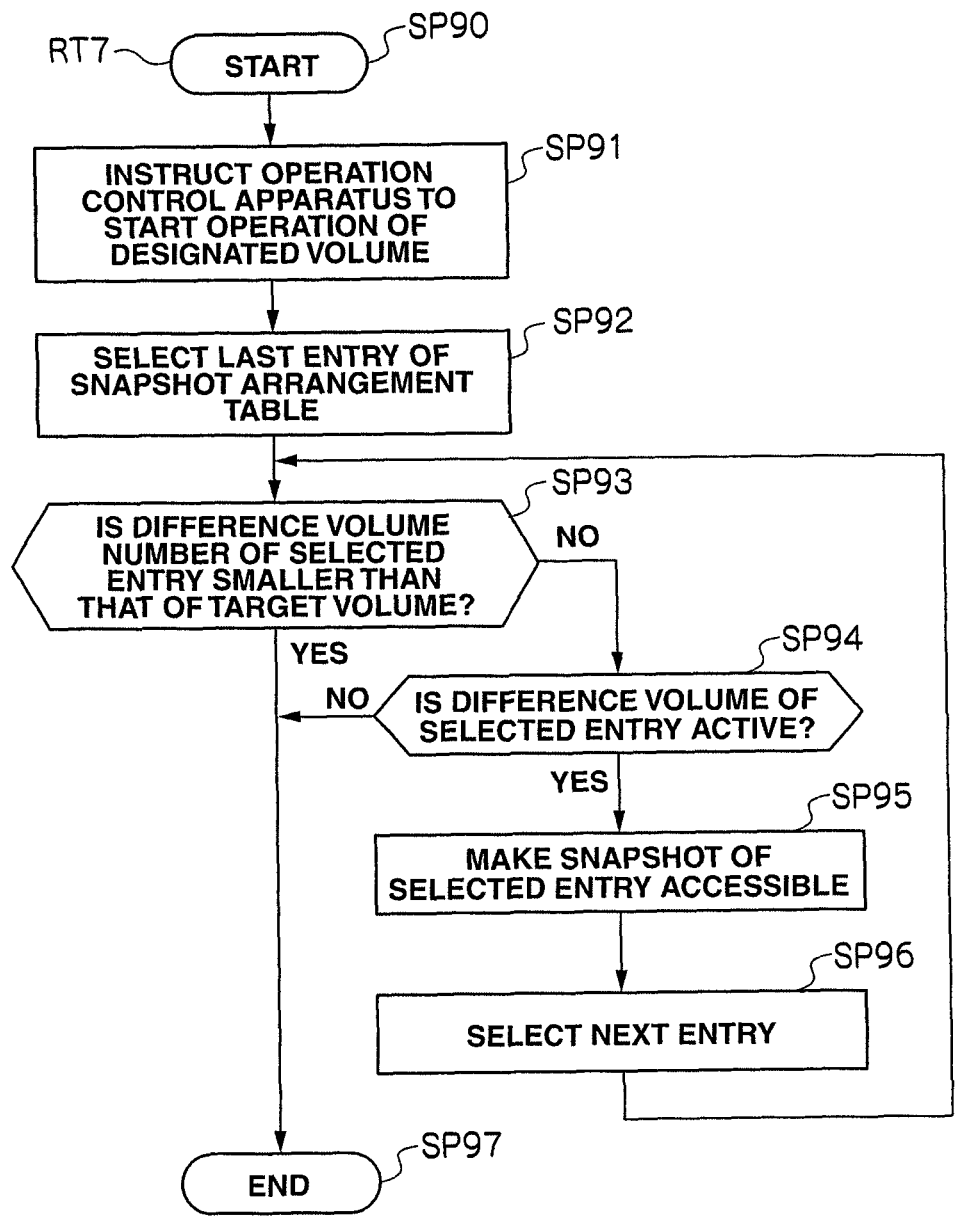
FIG. 24 is a flowchart showing difference volume activation processing.
Figure 25:
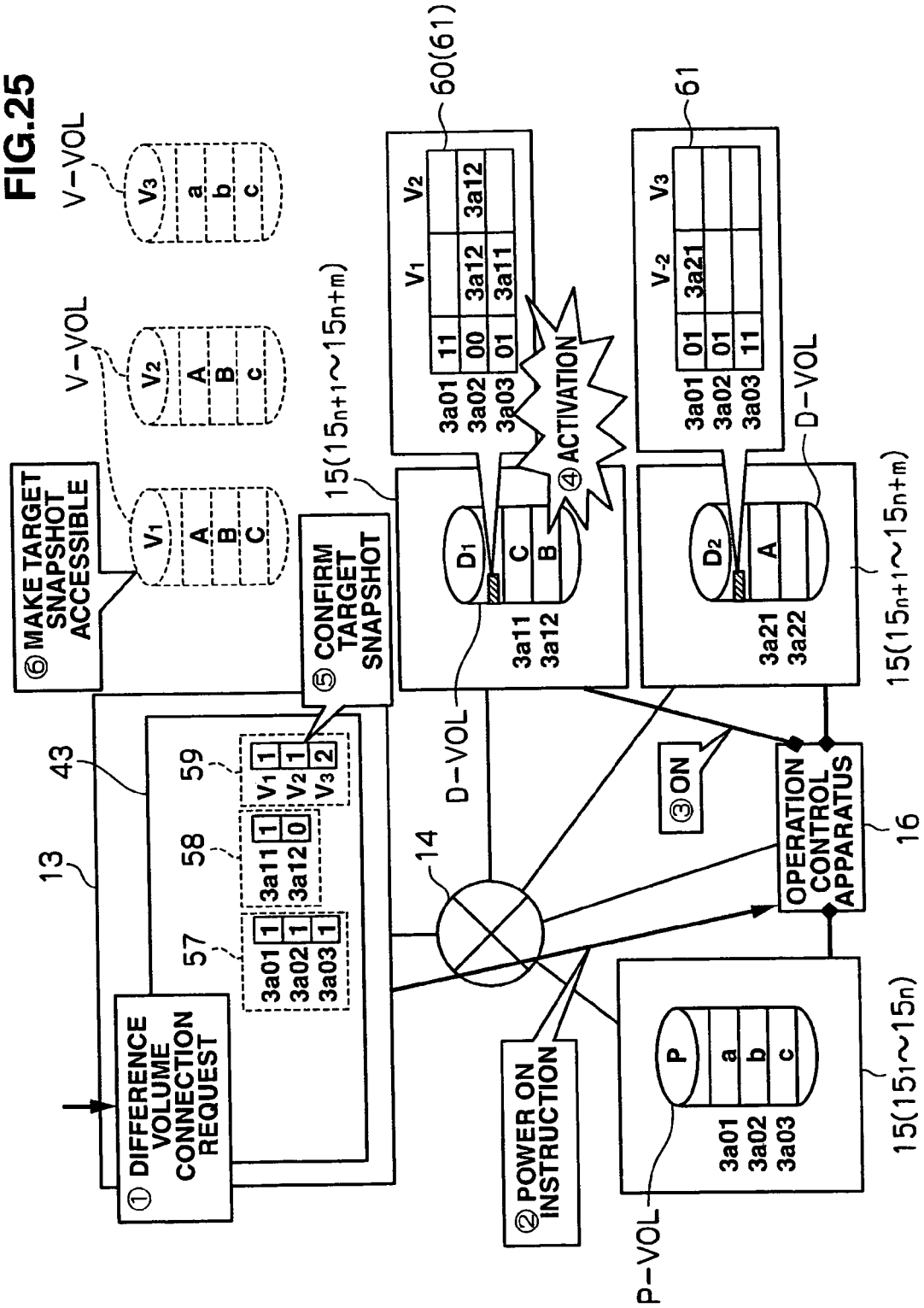
FIG. 25 is a conceptual diagram that explains the difference volume activation processing.

FIG. 24 is a flowchart explaining the details of processing executed by the CPU 21 of the NAS server system 13 regarding the difference volume activation processing. FIG. 25 shows the sequence of the difference volume activation processing. The CPU 21 executes the difference volume activation processing by following the sequence shown in this flowchart according to the difference volume activation subprogram 56 of the snapshot management program 43 (FIG. 5).

Specifically speaking, when the difference volume D-VOL disconnected as described above enters a specified state where it could be activated (i.e., where the relevant storage apparatus $15_{n+1}$ to $15_{n+m}$ providing that difference volume D-VOL could have its operation resumed), for example, if an access is made to the difference volume D-VOL, or if the server administrator gives an activation instruction, or if the relevant failure is solved, the CPU 21 starts the difference volume activation processing (SP90) and first issues an instruction to the operation control apparatus 16 (FIG. 4) to resume the operation of the target difference volume D-VOL (SP91).

Next, the CPU 21 selects the last entry of the snapshot arrangement table 59 (FIG. 8) in the snapshot management program 43 (SP92) and judges whether or not the difference volume number of the difference volume D-VOL associated with the snapshot V-VOL of this entry is smaller than the target difference volume D-VOL (SP93).

If the judgment result is "NO" (SP93: NO), the CPU 21 judges whether or not the difference volume D-VOL of the entry selected in step SP92 is in operation (SP94). If the judgment result is "YES" (SP94: YES), the CPU 21 makes internal settings so that the snapshot V-VOL of the entry selected in step SP92 becomes accessible (SP95).

Subsequently, the CPU 21 selects the next entry of the snapshot arrangement table 59 (SP96) and then repeats the same processing sequence for this entry and any preceding entries (from SP93 to SP96 and then back to SP93).

When the internal settings have been made so that all the entries of the snapshots V-VOL from the last registered entry to the entry associated with the target difference volume D-VOL on the snapshot arrangement table 59 have become accessible and the judgment result in step SP93 thereby becomes "YES" (SP93: YES), or when the difference volume D-VOL of the entry selected in step SP92 is not in operation and the judgment result in step SP94 thereby becomes "NO" (SP94: NO), the CPU terminates the difference volume disconnection processing (SP97).

(4) Advantageous Effects of this Embodiment

In the configuration described above, the NAS server system 13 sets one difference volume D-VOL for each storage apparatus $15_{n+1}$ to $15_{n+m}$ for the snapshot service, creates the mapping table 60 or 61 for each difference volume D-VOL, and manages the snapshots V-VOL associated with the corresponding difference volumes D-VOL according to these mapping tables 60 and 61.

Therefore, in the storage system 10, it is possible to save the difference data concerning the current snapshot V-VOL and record its management information by accessing the latest mapping table 60 or 61.

As a result, in the storage system 10, the scale of the individual mapping table 60 or 61 can be kept to a desirable size regardless of the number of retained snapshots. Therefore, overhead caused by access to the mapping tables can be reduced and it is thereby possible to effectively prevent a decrease in writing speed due to the overhead as well as the resultant deterioration in the performance of the entire system.

Moreover, in this storage system 10, each of the second and any following management tables 61 has the inheritance fields 61C to inherit the content of the previous mapping table 60 or 61, and is designed to store the necessary information (block addresses) in the inheritance fields 61C. Therefore, it is possible to manage the snapshots V-VOL on a mapping table basis. Even if inconsistency in the current snapshot V-VOL arises from, for example, line disturbance, the other snapshots managed by the other mapping tables 60 or 61 can be protected from the influence of that inconsistency.

Accordingly, even if this storage system 10 retains a multiplicity of snapshots, it can prevent deterioration in performance due to overhead caused by accesses to the mapping tables 60 and 61 and realize high reliability as a storage system.

(5) Other Embodiments

The above embodiment describes the case where the present invention is applied to the NAS server system 13. However, this invention is not limited to that application, and can be applied to a wide variety of other snapshot management apparatuses for managing snapshots.

Moreover, the above embodiment describes the case where one difference volume D-VOL is set for each storage apparatus $15_{n+1}$ to $15_{n+m}$ for the snapshot service. However, this invention is not limited to those settings, and a plurality of difference volumes D-VOL may be set for each storage apparatus $15_{n+1}$ to $15_{n+m}$ and the mapping table 60 or 61 may be created for each of these difference volumes D-VOL.

Furthermore, the above embodiment describes the case where the operation of the storage apparatus $15_{n+1}$ to $15_{n+m}$ storing the relevant difference volume D-VOL is simply stopped at the time of the difference volume disconnection processing. However, this invention is not limited to that example, and a copy of the difference data in the difference volume D-VOL stored in the relevant storage apparatus $15_{n+1}$ to $15_{n+m}$ may be temporarily stored in the NAS server system 13 or other storage apparatus $15_{n+1}$ to $15_{n+m}$ that has not had its operation stopped. As a result, it is possible to reduce the number of storage apparatuses $15_{n+1}$ to $15_{n+m}$ that need to have their operation resumed when necessary. In this case, the copy of the difference data may be discarded after completion of referring to the snapshots V-VOL.

What is claimed is:

1. A management computer for creating and managing snapshots of one or more generations, connected to a first storage system providing an operational volume storing data used by a host computer and a second storage system and third storage system each providing difference volumes storing difference data between the operational volume at a time of creation of a relevant snapshot, the management computer comprising:
a control unit for controlling storing of the difference data in the second or the third storage system, in response to data writing from the host computer,
a memory including a snapshot arrangement table for managing a relation between the snapshots and the difference volumes, and
a monitoring unit for showing a certain trigger of difference volumes relating to a power supply for the second or the third storage system,
wherein the second storage system stores is configured to store a management table for managing a plurality of snapshots corresponding to the difference volume of the second storage system, and the third storage system is configured to store a management table for further storing specified inheritance information to inherit content of the management table of the second storage system,
wherein, in the snapshot arrangement table, a first snapshot is related to a first differential volume in the second storage system, a second snapshot is related to a second differential volume in the third storage system, data of the first snapshot is provided by data in the first differential volume and data in the second differential volume and data in the operational volume, and data of the second snapshot is provided by data in the second differential volume and data in the operational volume,
wherein, when the control unit detects that the first snapshot related to the first differential volume does not receive a predetermined access during a pre-determined period the control unit is configured to confirm the status of the difference volume, and to determine to stop the power supply of the second storage system.

2. The management computer according to claim 1, wherein the certain trigger is one of no access to the difference volume for a certain period, receipt of a disconnection instruction of the difference volume, and a failure of the second storage system.

3. The management computer according to claim 1, wherein the control unit is configured to create the management tables and to send each corresponding management table to the second and the third storage.

4. The management computer according to claim 1, wherein, when the control unit judges a second trigger by the monitoring unit, the control unit is configured to send an instruction of starting the power supply to the second storage system and to make the snapshots, corresponding to the difference volume of the storage system, accessible.

5. The management computer according to claim 4, wherein the second trigger is one of an access to the difference volume, receipt of a connection instruction of the difference volume, and a restoration of failure of the storage systems.

6. The management computer according to claim 1, wherein the monitoring unit is configured to set management information of the difference volumes.

* * * * *